United States Patent
Hsieh et al.

(10) Patent No.: US 12,443,006 B2
(45) Date of Patent: Oct. 14, 2025

(54) OPTICAL LENS MODULE AND WEARABLE ELECTRONIC DEVICE

(71) Applicant: NEWMAX TECHNOLOGY CO., LTD., Taichung (TW)

(72) Inventors: Xiang-Lin Hsieh, Taichung (TW); Hung-Yu Su, Taichung (TW)

(*) Notice: Subject to any disclaimer, the term of this patent is extended or adjusted under 35 U.S.C. 154(b) by 100 days.

(21) Appl. No.: 18/624,106

(22) Filed: Apr. 1, 2024

(65) Prior Publication Data
US 2025/0208377 A1 Jun. 26, 2025

(30) Foreign Application Priority Data
Dec. 21, 2023 (TW) ................. 112149931

(51) Int. Cl.
G02B 7/36 (2021.01)
G01B 5/24 (2006.01)
G01B 7/14 (2006.01)
G01S 17/08 (2006.01)
G06F 1/16 (2006.01)
H04N 23/80 (2023.01)

(52) U.S. Cl.
CPC ............. G02B 7/36 (2013.01); G01B 5/24 (2013.01); G01B 7/14 (2013.01); G01S 17/08 (2013.01); G06F 1/163 (2013.01); H04N 23/80 (2023.01)

(58) Field of Classification Search
CPC .... G02B 7/36; G01B 5/24; G01B 7/14; G01S 17/08; G06F 1/163; H04N 23/80
See application file for complete search history.

(56) References Cited

U.S. PATENT DOCUMENTS

| | | | |
|---|---|---|---|
| 2007/0127124 A1* | 6/2007 | Iwasawa | G02B 15/177 359/557 |
| 2008/0218612 A1* | 9/2008 | Border | G03B 13/36 348/262 |
| 2019/0187403 A1* | 6/2019 | Wada | H04N 3/00 |
| 2021/0120162 A1* | 4/2021 | Tanaka | H04N 23/667 |
| 2022/0229279 A1* | 7/2022 | Schumann | G02B 27/0068 |

* cited by examiner

*Primary Examiner* — Hung H Lam
(74) *Attorney, Agent, or Firm* — Bruce Stone LLP; Joseph A. Bruce

(57) ABSTRACT

An optical lens module includes: an operating element which includes a first lens unit, and a second lens unit; a holder arranged on the image source side of the second lens unit; an image source element disposed to the holder; an image processor electrically connected to the image source element to provide correction data of image quality; and a detection unit electrically connected to the image processor to provide a feedback signal; When the operating element is activated, the operating element drives the first lens unit or the second lens unit to move along a central axis, changing the distance between the first and second lens units on the central axis, the detection unit generates the feedback signal and transmits it to the image processor, and then the image processor provides an correction data of image quality corresponding the feedback signal to the image source element.

24 Claims, 24 Drawing Sheets

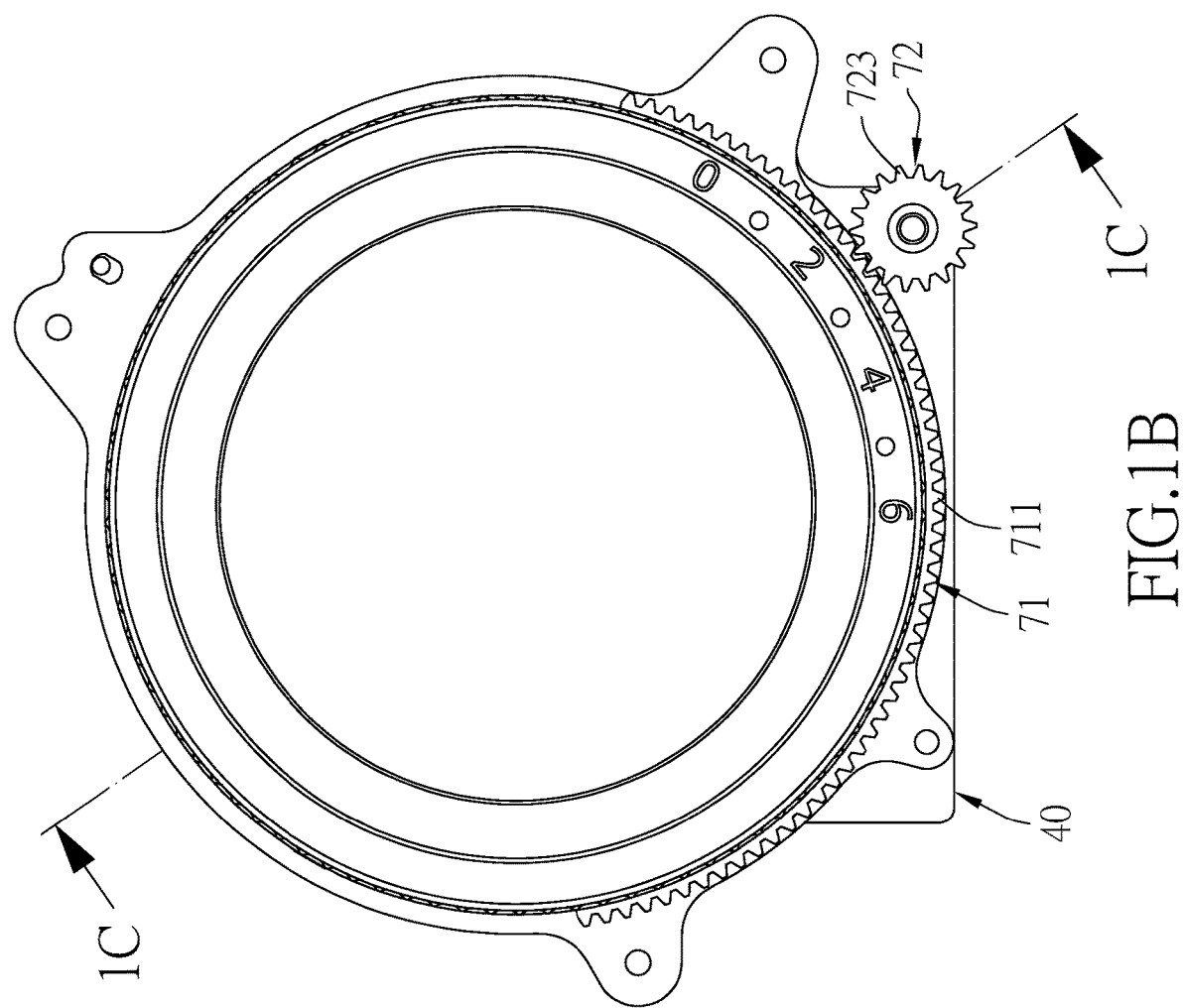

OPTICAL LENS MODULE AND WEARABLE ELECTRONIC DEVICE

BACKGROUND

Field of the Invention

The present invention relates to an optical lens module, and more particularly to an optical lens module and a wearable electronic device.

Description of Related Art

At present, some wearable electronic devices are equipped with the virtual reality (VR) technology, which provides users with an immersive image or audio experience through the virtual reality technology. The technical core of the VR technology is the optical lens module, and the quality of the image displayed by the optical module will directly determine the user's experience of image or audio and video.

However, the visual acuity of different users varies and some users need to wear glasses for seeing images clearly, so wearing glasses and wearable electronic devices at the same time will cause poor experience for users. Therefore, a focal length adjustment mechanism is designed on wearable electronic devices to be suitable for all kinds of people. However, currently wearable electronic devices can cause image distortion after adjusting the diopter, which causes many users to experience visual fatigue, discomfort and image quality decline when using wearable electronic devices, thus affecting the experience of use.

SUMMARY

The objective of the present invention is to provide an optical lens module, which is capable of adjusting the image while adjusting the diopter, thereby reducing visual fatigue and discomfort and enhancing the image quality.

To achieve the above objective, an optical lens module in accordance with the present invention has a central axis and includes: an operating element including an annular wall surrounding the central axis with a visual side and an image source side, and a storage space enclosed by the annular wall; a first lens unit disposed in the storage space and including a first lens barrel and a first lens group disposed in the first lens barrel; a second lens unit disposed in the storage space and including a second lens barrel and a second lens group disposed in the second lens barrel; a holder disposed on an image source side of the second lens unit; an image source element disposed on the holder; an image processor electrically connected to the image source element, and including correction data of image quality and an image signal; and a detection unit electrically connected to the image processor to provide a feedback signal. The first lens unit and the second lens unit are arranged in order from the visual side to the image source side of the central axis. When the operating element is actuated, the operating element drives the first lens unit or the second lens unit to move along the central axis to change a distance between the first lens unit and the second lens unit along the central axis, the detection unit generates and transmits the feedback signal to the image processor, and then, the image processor obtains the correction data of image quality according to the feedback signal and provides the correction data of image quality to the image source element.

The advantages of the invention are as follows. By adjusting the operating element to change the distance between the first lens unit and the second lens unit, different diopters are formed for users with different visual acuity. In the process of adjusting the operating element, the detection unit will generate a feedback signal corresponding to the adjustment and transmit the feedback signal to the image processor. The image processor then finds the correction data of image quality corresponding to the feedback signal, and provides the image signal corresponding to the correction data of image quality. The image signal can be an anti-distortion image signal provided to the image source element, whereby the output of the image source element can be imaged as a distortion-free image through the first lens unit and the second lens unit. Hence, the optical lens module in the present invention realizes the myopia adjustment effect by adjusting the imaging position, so as to adapt to the difference between visual acuity of different users, and solve the image quality problem caused by different diopters due to users' different degrees of myopia, thereby reducing visual fatigue and discomfort and enhancing the image quality.

Optionally, the correction data of image quality includes correction datum of distortion, correction data of field of view, correction data of transverse chromatic aberration, or correction data of relative illuminance.

Optionally, the detection unit includes a toothed structure and a rotary encoder, the toothed structure is located on the operating element and includes first teeth, the rotary encoder includes an encoder body and a shaft disposed to the encoder body, and the shaft includes second teeth directly or indirectly engaged with the first teeth; and when the operating element is rotated, the toothed structure drives the shaft to rotate and the encoder body detects a rotation angle of the shaft to generate the feedback signal corresponding to the rotation angle.

Optionally, the detection unit includes an impedance element and a contact probe, the impedance element is arranged along a circumferential direction on the operating element, and has a same resistance in the circumferential direction, and the contact probe is disposed to the holder; and when the operating element is actuated, the contact probe contacts the impedance element to generate the feedback signal corresponding to an amount of displacement of the contact between the contact probe and the impedance element.

Optionally, the detection unit includes a distance sensor, the distance sensor is disposed to the first lens barrel or the second lens barrel and is configured to sense a distance between the first lens barrel and the second lens barrel to generate the feedback signal according to the distance.

Optionally, the detection unit includes a conductor and a sensing element, the conductor includes a first conductor material, the sensing element includes a second conductor material, the conductor is disposed to the operating element, the sensing element is disposed to the first lens barrel or the second lens barrel, the conductor and the sensing element have an overlapping area therebetween in a radial direction, the overlapping area changes with the operation of the operating element, and a capacitive induction is invoked at the overlapping area to generate the feedback signal.

Optionally, the detection unit includes a power source and a resistor, a first power source end of the power source is electrically connected to a first resister end of the resistor, a second power source end of the power source is electrically connected to the sensing element, and a second resister end of the resistor is electrically connected to the conductor.

Optionally, a resistance of the resistor is R, the overlapping area is A, a distance between the conductor and the sensing element is d1, and the following condition is satisfied: 57.31 Ω*mm<(R*A/d1)<3276.85 Ω*mm.

Optionally, the detection unit includes a first metal sheet and a second metal sheet, the first metal sheet is disposed to the first lens barrel, the second metal sheet is disposed to the second lens barrel and faces the first metal sheet, and when the operating element is rotated, a capacitance induction is invoked between the first metal sheet and the second metal sheet to generate the feedback signal corresponding to the capacitance induction.

Optionally, the detection unit includes a power source and a resistor, a first power source end of the power source is electrically connected to a first resister end of the resistor, a second power source end of the power source is electrically connected to the first metal sheet, and a second resister end of the resistor is electrically connected to the second metal sheet.

Optionally, a distance between the first metal sheet and the second metal sheet is d2, a resistance of the resistor is R, an overlapping area between the first metal sheet and the second metal sheet is A, and the following condition is satisfied:

$$9.21\Omega/\text{mm} < (d2*R/A) < 184.34\Omega/\text{mm}.$$

Optionally, the detection unit includes a microstructure element and an optical reader, the microstructure element is located on an outer annular surface of the operating element and includes rough surfaces of different types, the optical reader is disposed to the holder and includes a reading head for reading the rough surfaces of the microstructure element, and when the operating element is actuated, the reading head reads the rough surface of the microstructure element to generate the feedback signal according to the type of the rough surface.

Optionally, the optical lens module further includes an indicator cover located at a visual end of the operating element, and the detection unit is an optical sensor configured to detect an imaging distance from the image source element through the lens units, to generate the feedback signal according to the imaging distance.

Furthermore, the present invention provides a wearable electronic device, including: a frame; and the above-mentioned optical lens module disposed to the frame.

The wearable electronic device in the present invention realizes the myopia adjustment effect by adjusting the imaging position, so as to adapt to the difference between visual acuity of different users, and solve the image quality problem caused by different diopters due to users' different degrees of myopia, thereby reducing visual fatigue and discomfort and enhancing the image quality.

Optionally, the number of optical lens modules is two.

BRIEF DESCRIPTION OF THE DRAWINGS

FIG. 1B is a top view of the first embodiment of the present invention;

DETAILED DESCRIPTION

Figure 1A:
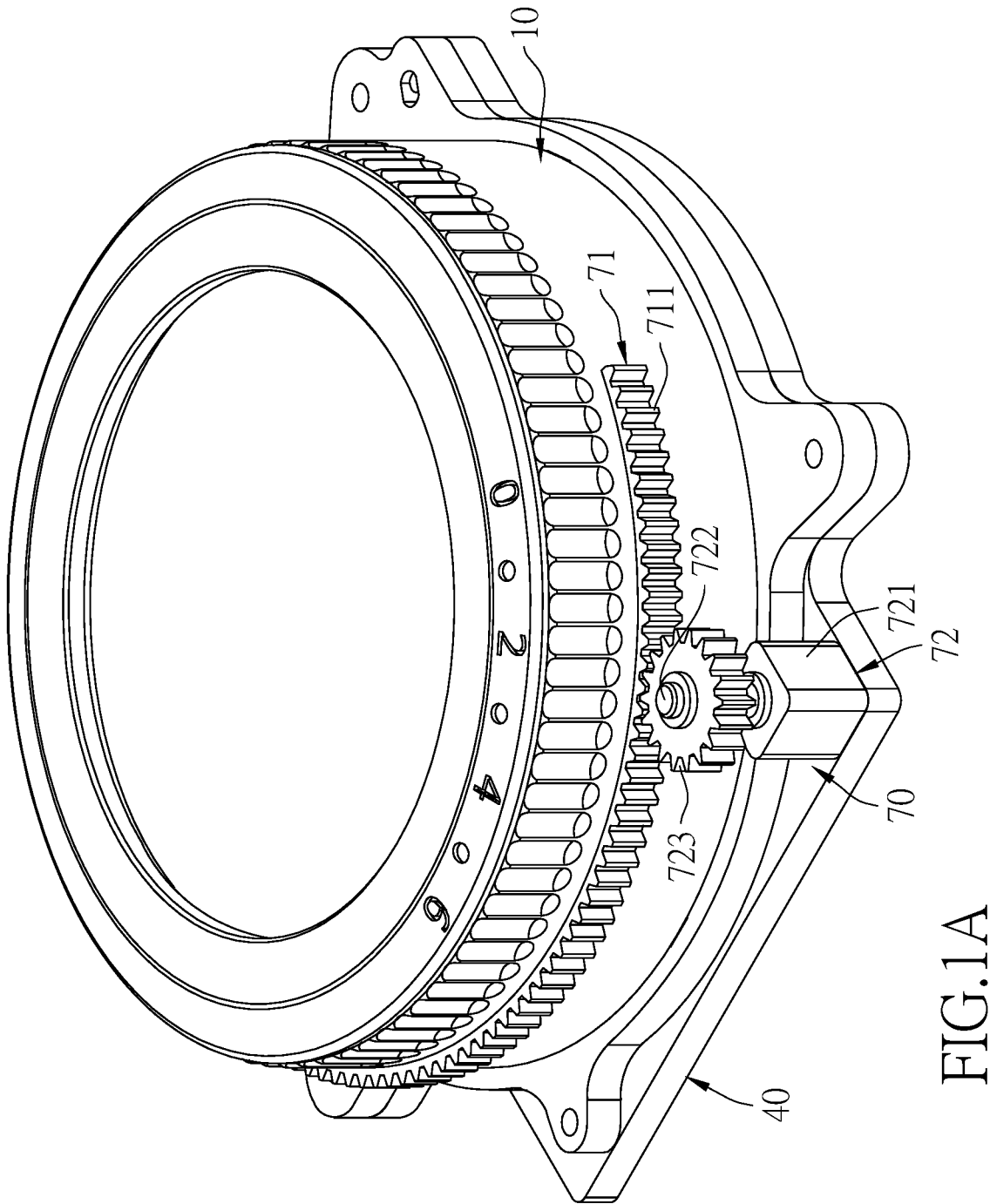
FIG. 1A is a perspective view of a first embodiment of the present invention.
Figure 1C:
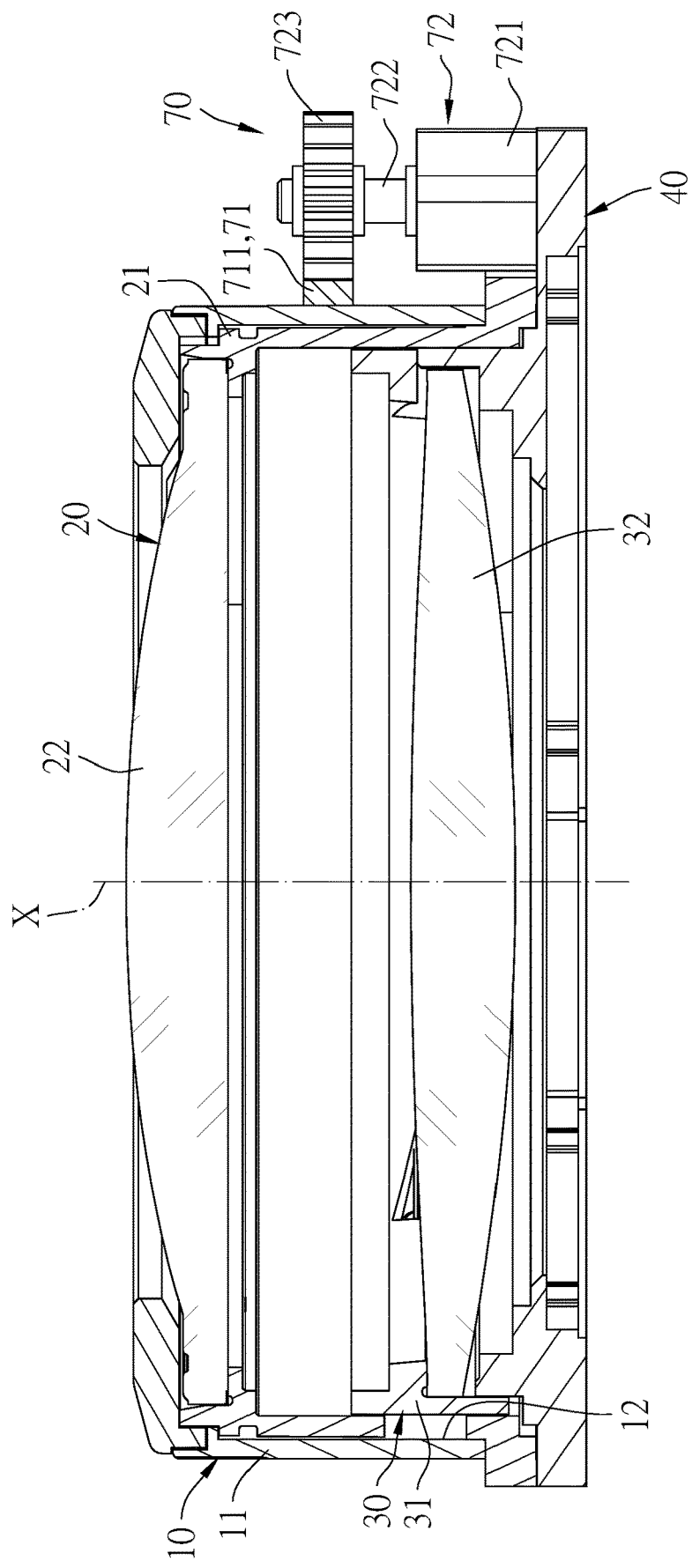
FIG. 1C is a cross-sectional view of the first embodiment of the present invention.
Figure 1D:
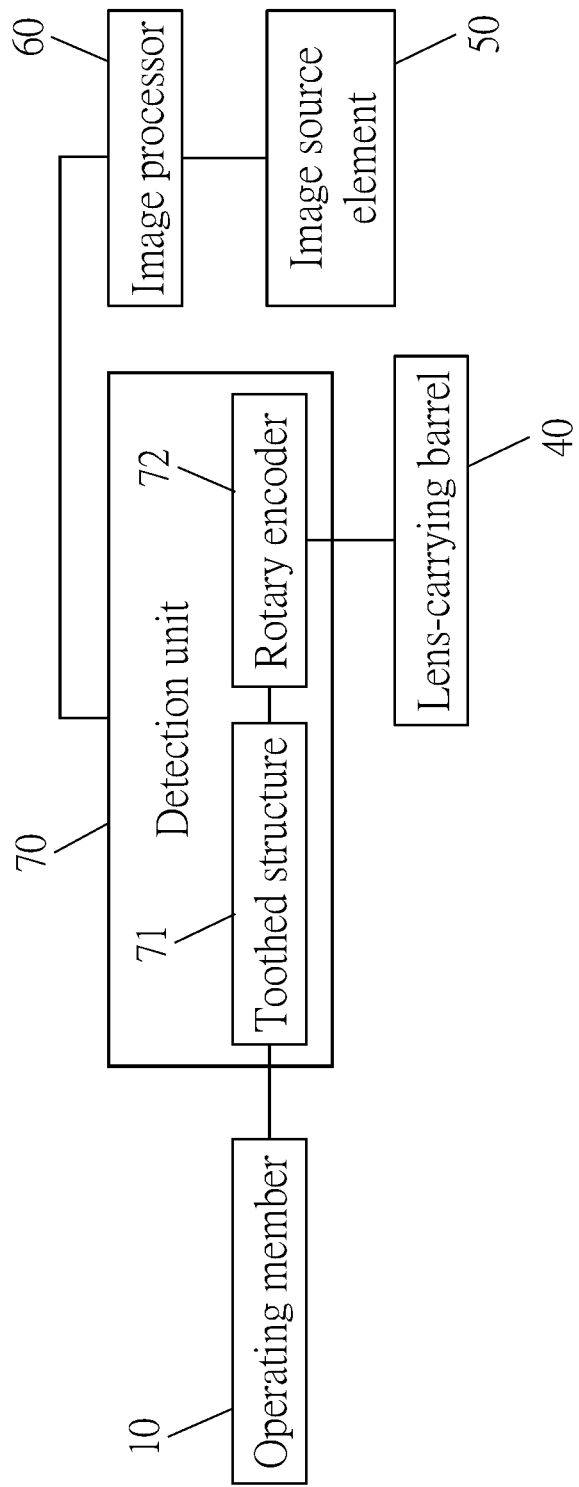
FIG. 1D is a block diagram of the first embodiment of the present invention.

Before giving a detailed description, it should be noted that in the following description, similar components and parts are represented by the same number.

First Embodiment

Referring to FIGS. 1A to 1D, the first embodiment of the present invention provides an optical lens module with a central axis X, including an operating element 10, a first lens unit 20, a second lens unit 30, a holder 40, an image source element 50, an image processor 60, and a detection unit 70.

The operating element 10 includes an annular wall 11 surrounding the central axis X, and a storage space 12 enclosed by the annular wall 11, and further includes, in order from a visual side to an image source side, the first lens unit 20 and the second lens unit 30.

The first lens unit 20 is disposed in the storage space 12 of the operating element 10 and includes a first lens barrel 21 and a first lens group 22 fixed inside the first lens barrel 21. In this embodiment, the first lens group 22 is exemplified by one lens but is not limited thereto.

The second lens unit 30 is disposed in the storage space 12 of the operating element 10, is movable along the central axis X, and includes a second lens barrel 31 and a second lens group 32 fixed inside the second lens barrel 31 and facing the first lens group 22. In this embodiment, the second lens group 32 is exemplified by one lens.

The holder 40 is disposed at the image source side of the second lens unit 30.

The image source element 50 is disposed to the holder 40, for providing an image light source to the first lens unit 20.

The image processor 60 is electrically connected to the image source element 50 and includes a correction data of image quality and an image signal. The correction data of image quality includes distortion correction data, field angle correction data, transverse chromatic aberration correction data, or relative illumination correction data, but is not limited thereto, for the processing and optimizing of the image signal. The image processor 60 provides the image signal which is corrected according to the correction data of image quality, to the image source element 50.

The detection unit 70 is electrically connected to the image processor 60 to provide a feedback signal. In this embodiment, the detection unit 70 includes a toothed structure 71 and a rotary encoder 72. The toothed structure 71 is disposed on the outer annular surface of the operating element 10 and includes first teeth 711. The rotary encoder 72 is disposed to the holder 40 and includes an encoder body 721 and a shaft 722 disposed to the encoder body 721. The shaft 722 includes second teeth 723 for directly engaged with the first teeth 711.

Therefore, when the operating element 10 is actuated, it drives the second lens unit 30 to move along the central axis X, to change the distance between the first lens unit 20 and the second lens unit 30 along the central axis X, but is not limited thereto. In another embodiment, when the operating element 10 is actuated, it drives the first lens unit 20 to move along the central axis X to similarly change the distance between the first lens unit 20 and the second lens unit 30 on the central axis X. Additionally, while the operating element 10 is being rotated, the toothed structure 71 disposed on the operating element 10 drives the shaft 722 of the rotary encoder 72 to rotate, and the encoder body 721 detects the rotation angle of the shaft 722 to generate the feedback signal corresponding to the rotation angle, and then the detection unit 70 transmits the generated feedback signal to the image processor 60. The image processor 60 finds the correction data of image quality corresponding to the feedback signal and provides the image signal corresponding to the correction data of image quality. The image signal can be an anti-distortion image signal provided to the image source element 50, so that the image source provided by the image source element 50 is imaged through the first lens unit 20 and the second lens unit 30 to form a distortion-free image.

For example, with reference to Table 1 below, the correction data of image quality within the image processor 60 is shown. From Table 1, it can be seen that when the user operates the operating element 10 to rotate from its rotation angle of 0 degrees to its rotation angle of 30 degrees, the diopter correspondingly changes from 0D to 3D and the correction data of image quality (distortion) also correspondingly changes from −27.39% to −31.81%. At this time, the image processor 60 provides an image signal to the image source element 50 corresponding to the correction data of image quality (−31.81%), so that the image light source provided by the image source element 50 forms a distortion-free image after passing through the first lens unit 20 and the second lens unit 30. The image quality correction in the present invention is to perform isometric reverse distortion to the image signal in advance and then provide it to the image source element 50, to enable that the image displayed by the image source provided by the image source element 50 becomes a distortion-free image after passing through the first lens unit 20 and the second lens unit 30. For example, when the operating element is directed to 30 degrees, the image passing through the lens units will have pincushion distortion in the case of not using the present invention, but will have no distortion in the case of using the present invention where the image signal is corrected to have barrel distortion in advance.

TABLE 1

| Rotation angle (°) | Diopter (mm$^{-1}$) | Distortion (%) |
|---|---|---|
| 0° | 0 | −27.39 |
| 30° | 3 | −31.81 |
| 60° | 6 | −32.24 |

Accordingly, the present invention adjusts the diopter and also adjusts the image, thereby solving the image quality problems caused by different diopters due to different degrees of myopic of users, reducing visual fatigue and discomfort, and enhancing the image quality.

Second Embodiment

Figure 2:
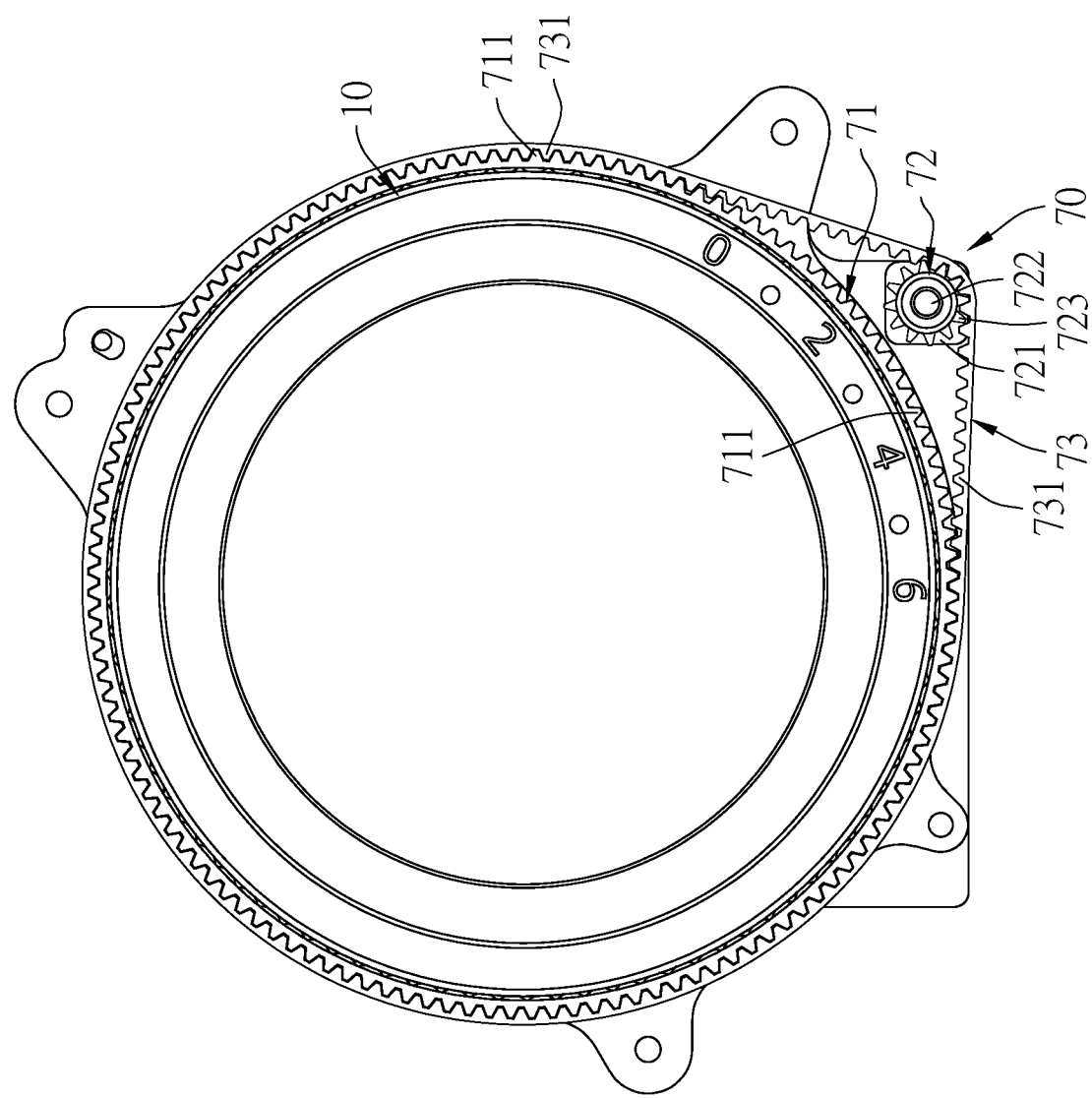
FIG. 2 is a top view of a second embodiment of the present invention.

As shown in FIG. 2, the second embodiment of the present invention provides an optical lens module, which differs from the first embodiment in the following aspects.

The toothed structure 71 and the rotary encoder 72 of the detection unit 70 are indirectly engaged, that is, the detection unit 70 further includes a transmission belt 73.

The toothed structure 71 is disposed on the outer annular surface of the operating element 10 and includes first teeth 711.

The rotary encoder 72 is disposed to the holder 40 and includes an encoder body 721 and a shaft 722 disposed to the encoder body 721. The shaft 722 includes second teeth 723 located at a distance from the first teeth 711.

The transmission belt 73 is ring-shaped and includes third teeth 731. Some of the third teeth 731 are engaged with the first teeth 711 of the toothed structure 71, and some of the third teeth 731 are engaged with the second teeth 723 of the shaft 722. By the transmission belt 73, it is possible to indirectly drive the shaft 722 to rotate when rotating the operating element 10, thereby forming another embodiment.

Third Embodiment

Referring to FIGS. 3A to 3E, the third embodiment of the present invention provides an optical lens module, which differs from the first embodiment in the following aspects.

The detection unit 70A includes an impedance element 71A and a contact probe 72A.

The impedance element 71A is arranged along a circumferential direction on the outer annular surface of the operating element 10 and has the same resistance in the circumferential direction. In this embodiment, the impedance element 71A is a thin film coated on the outer surface of the operating element 10 and is made of stainless steel or indium tin oxide (ITO). In addition, one end of the impedance element 71A is electrically connected to a power source 73A through a wire, that is, one end of the impedance element 71A is electrically connected to a first power source end 731A of the power source 73A.

Figure 3A:
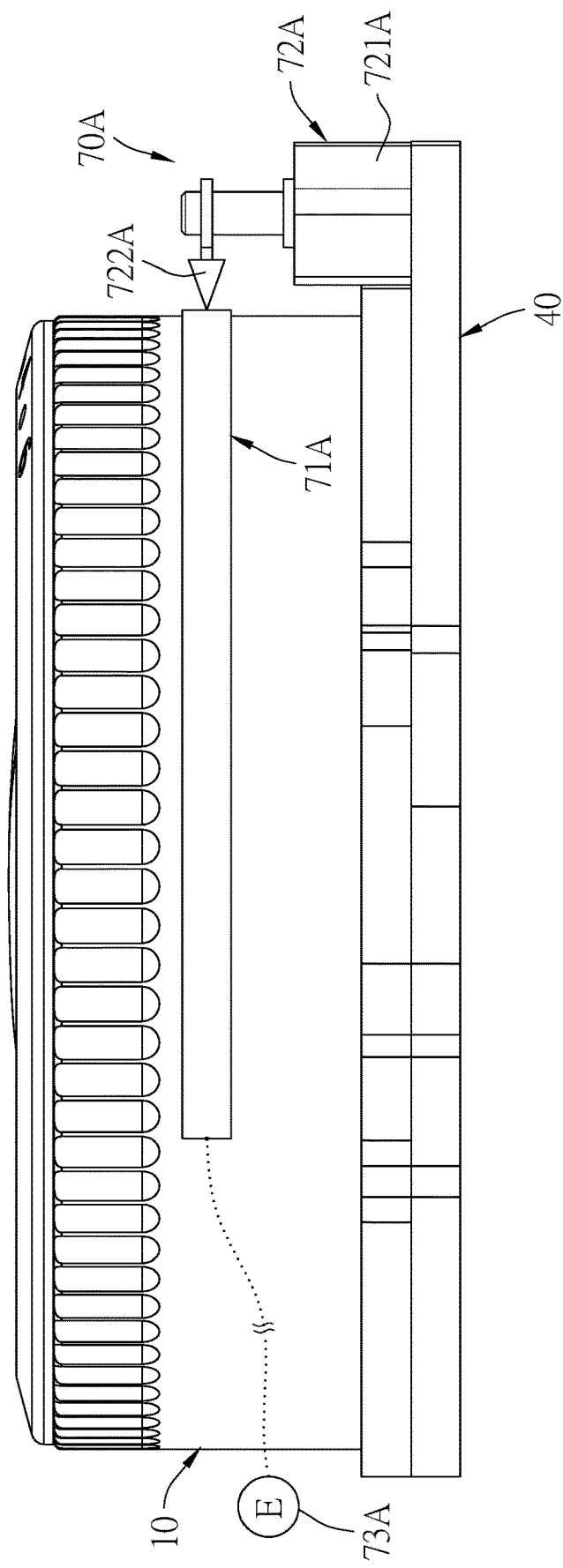
FIG. 3A is a side view of a third embodiment of the present invention.
Figure 3B:
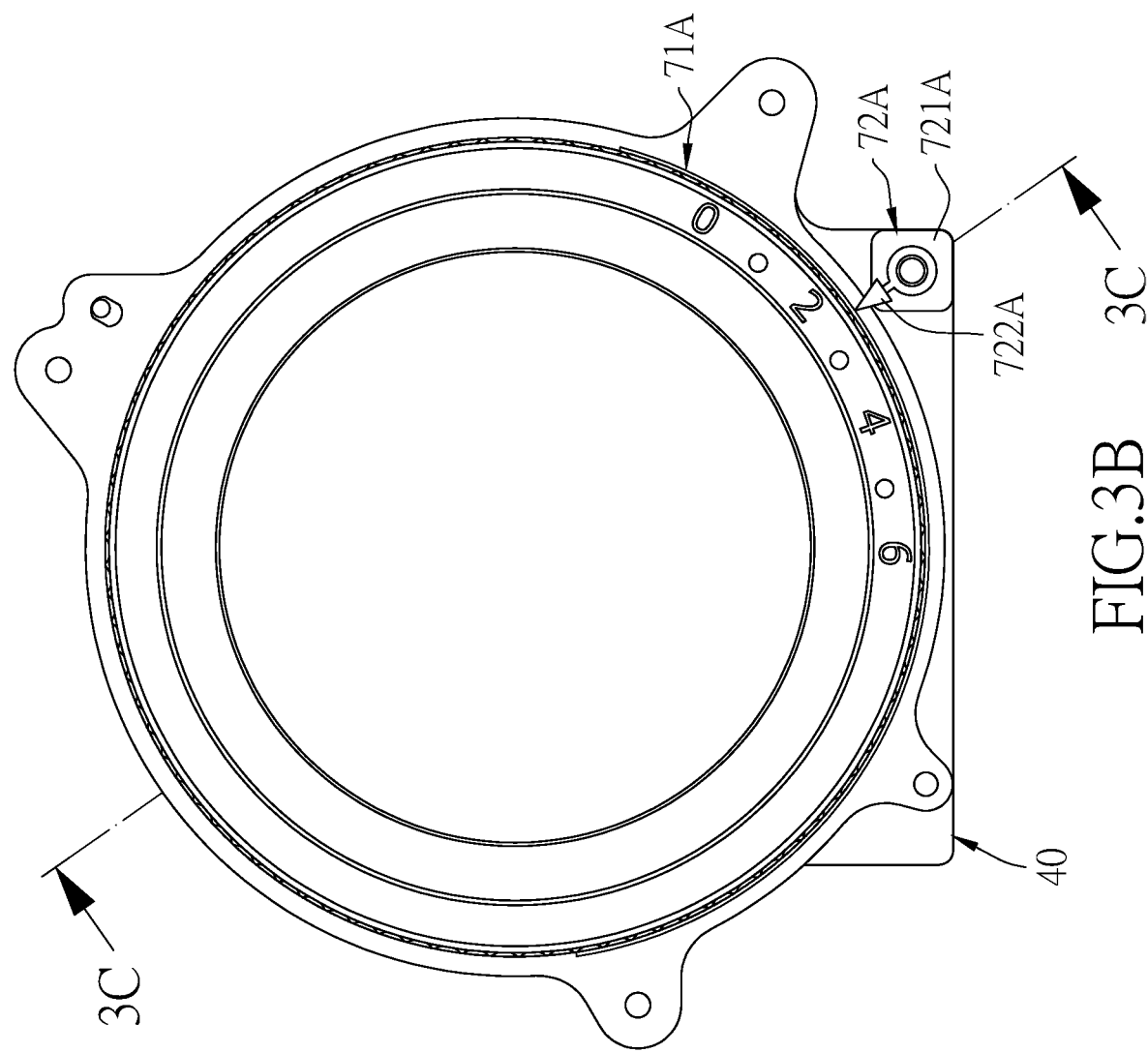
FIG. 3B is a top view of the third embodiment of the present invention.
Figure 3C:
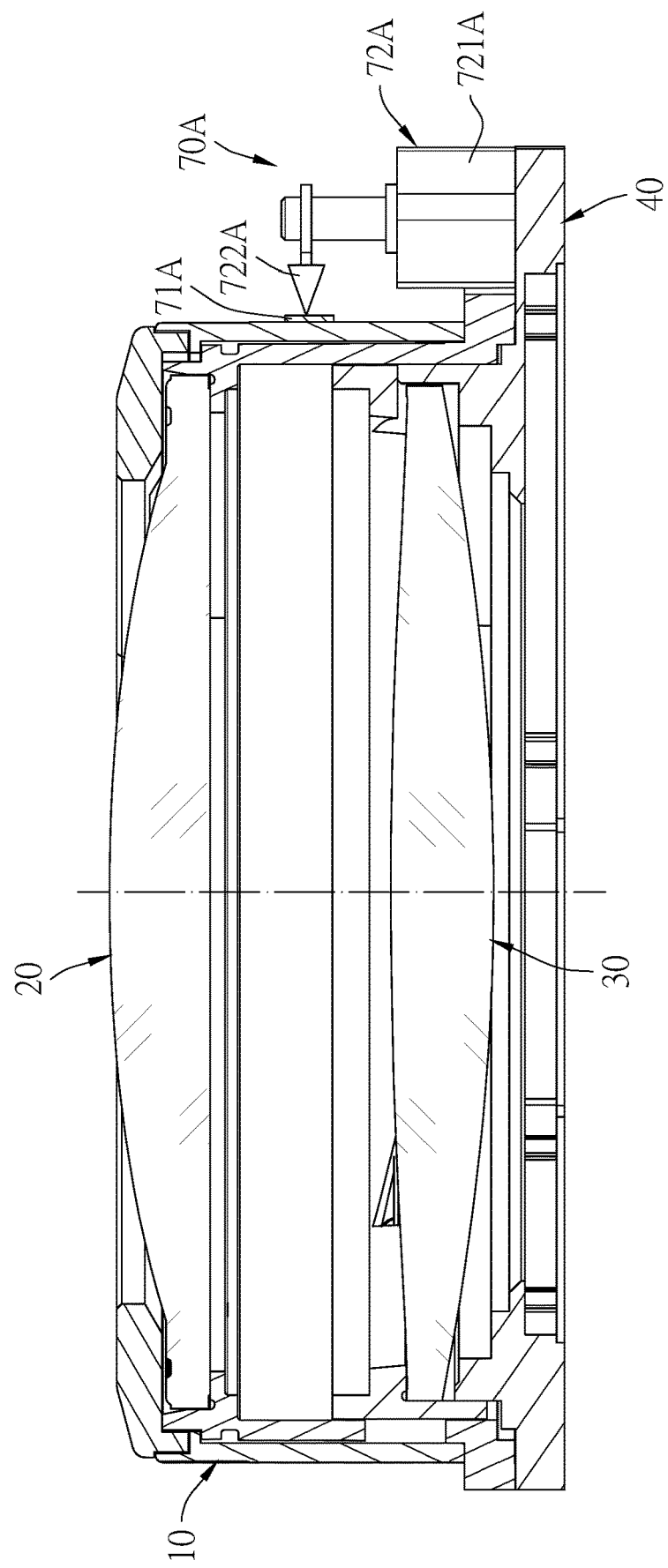
FIG. 3C is a cross-sectional view of the third embodiment of the present invention.
Figure 3D:
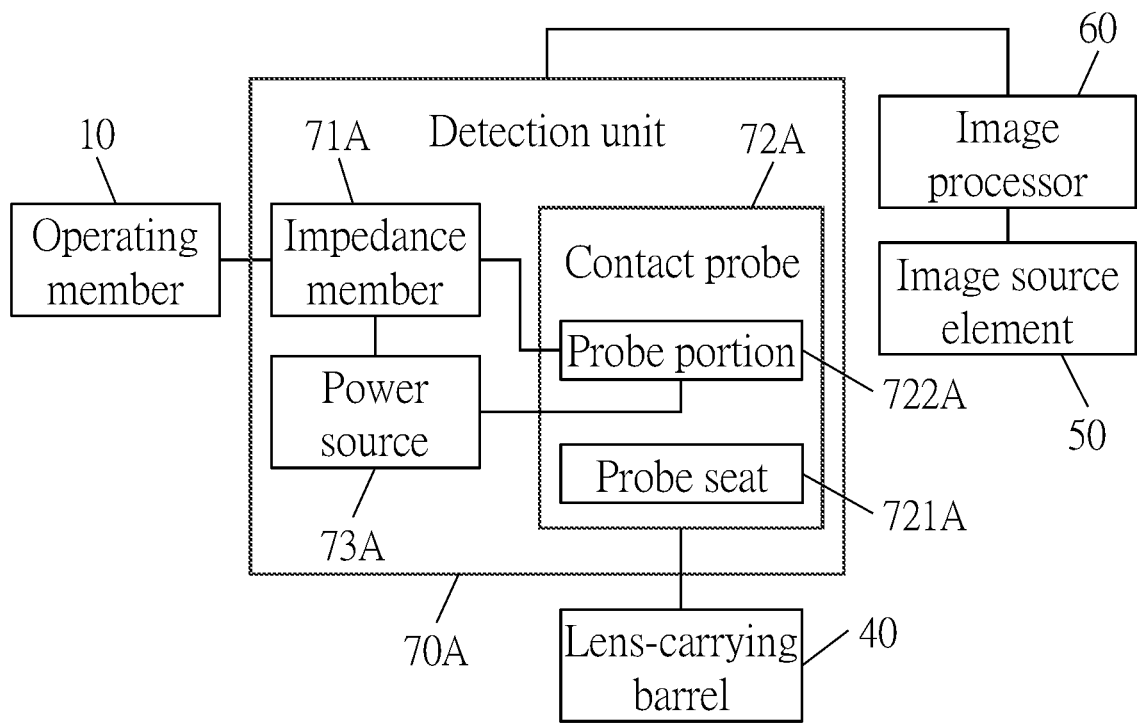
FIG. 3D is a block diagram of the third embodiment of the present invention.
Figure 3E:
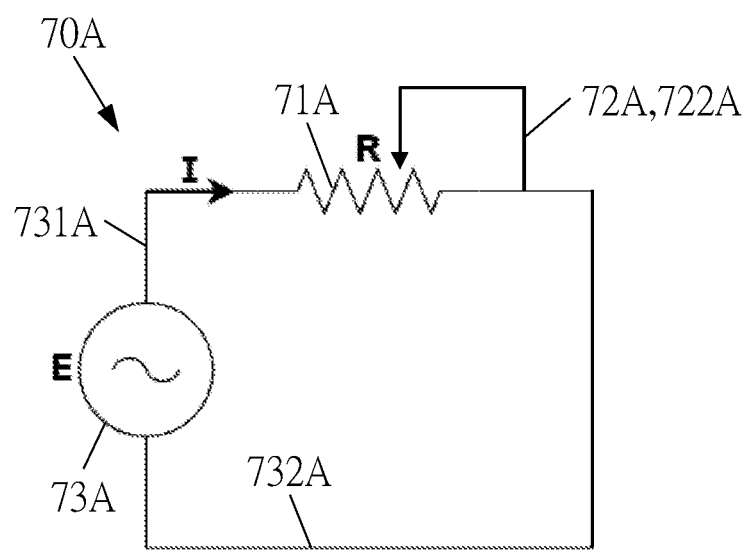
FIG. 3E is a schematic diagram of the third embodiment of the present invention, showing a series circuit formed by the impedance element, the contact probe, and the resistor.

As shown in FIG. 3A, the contact probe 72A is disposed to the holder 40 and includes a probe seat 721A and a probe portion 722A connected to the probe seat 721A and electrically contacting the impedance element 71A. The contact probe 72A is electrically connected to a second power source end 732A of the power source 73A, thereby forming a loop among the contact probe 72A, the impedance element 71A, and the power source 73A (as shown in FIG. 3E).

Please refer to the Table 2 below, when the user rotates the operating element 10, in addition to driving the second lens unit 30 (or the first lens unit 20) to move along the central axis X to change the distance between the first lens unit 20 and the second lens unit 30 on the central axis X, the operating element 10 in rotation also changes the position where the probe portion 722A of the contact probe 72A electrically contacts the impedance element 71A, so as to measure a current I of a different value. That is, by inputting a constant voltage or current, the resistance value R can be calculated using the formula R=V/I, and the resistance value R is the feedback signal. Moreover, the formula L=R*A/ρ is also given, where ρ represents the resistivity (Ω·m), L represents the length of the resistor (m), A represents the cross-sectional area of the resistor (m2). The length L of the resistor can be calculated as the cross-sectional area A and the resistivity ρ are constant. When the length L is known, the rotation angle can be calculated. Then, the rotation angle corresponds to the diopter and the distortion degree (as shown in Table 3). In Table 2, "calculated length L between the two measuring ends", namely the length of the resistor, is the distance between the power source 73A and the position where the probe portion 722A contacts the impedance element 71A. In Table 2, "rotation angle θ" refers to the rotation angle of the operating element 10, and "corresponding diopter D" is the diopter formed by the first lens unit 20 and the second lens unit 30 after the operating element 10 is rotated.

TABLE 2

| Material of impedance element | Constant voltage V (V) | Thickness of impedance element H (m) | Width of impedance element W (m) |
|---|---|---|---|
| Stainless steel | 1 | 5.00E−07 | 1.00E−03 |
|  | 1 | 5.00E−07 | 1.00E−03 |
| indium tin oxide (ITO) | 1 | 5.00E−07 | 1.00E−03 |
|  | 1 | 5.00E−07 | 1.00E−03 |

| Material of impedance element | Resistivity of impedance element ρ(Ω · m) | Measured current I (A) | Calculated resistance R (Ω) |
|---|---|---|---|
| Stainless steel | 7.20E−05 | 0.04 | 25 |
|  | 7.20E−05 | 2.75E−04 | 3636.36364 |
| indium tin oxide (ITO) | 6.59E−04 | 4.00E−03 | 250 |
|  | 6.59E−04 | 3.00E−05 | 33333.3333 |

| Material of impedance element | Calculated length between the two measuring ends L (mm) | Rotation angle θ (°) | Corresponding diopter D (mm$^{-1}$) |
|---|---|---|---|
| Stainless steel | 0.17 | 0.41 | 0.0 |
|  | 25.25 | 59.54 | 6.0 |
| indium tin oxide (ITO) | 0.19 | 0.45 | 0.0 |
|  | 25.29 | 59.63 | 6.0 |

TABLE 3

| Rotation angle (°) | Diopter (mm$^{-1}$) | Distortion (%) |
|---|---|---|
| 0° | 0 | −27.39 |
| 30° | 3 | −31.81 |
| 60° | 6 | −32.24 |

For example, with reference to Tables 2 and 3 above, the correction data of image quality stored in the image processor 60 is shown. From Table 2, it can be seen that when the impedance element 71A is made of stainless steel and the user operates the operating element 10 to change from the rotation angle of 0.41 degrees to the rotation angle of 59.54 degrees, the corresponding diopter changes from 0D to 6D, and the corresponding correction data of image quality (distortion) changes from −27.39% to −32.24%. At this time, the image processor 60 provides an image signal to the image source element 50 corresponding to the correction data of image quality (−32.24%), so that the image light source provided by the image source element 50 forms a distortion-free image after passing through the first lens unit 20 and the second lens unit 30. The image quality correction in the present invention is to perform isometric reverse distortion to the image signal in advance and then provide it to the image source element 50, to enable that the image displayed by the image source provided by the image source element 50 becomes a distortion-free image after passing through the first lens unit 20 and the second lens unit 30. Similarly, the image is adjusted in adjusting the diopter, whereby visual fatigue and discomfort will be reduced and the image quality will be enhanced.

Fourth Embodiment

Figure 4A:
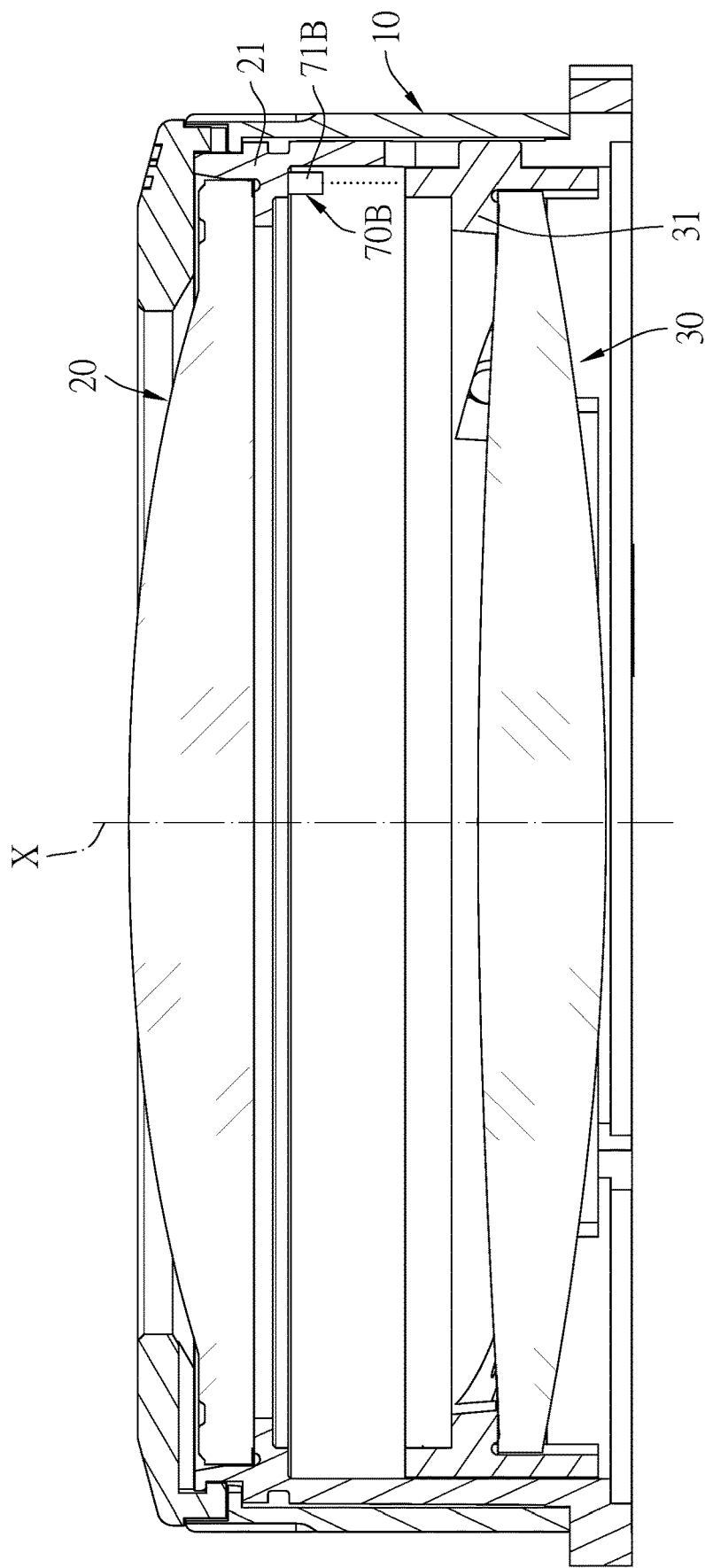
FIG. 4A is a cross-sectional view of a fourth embodiment of the present invention.
Figure 4B:
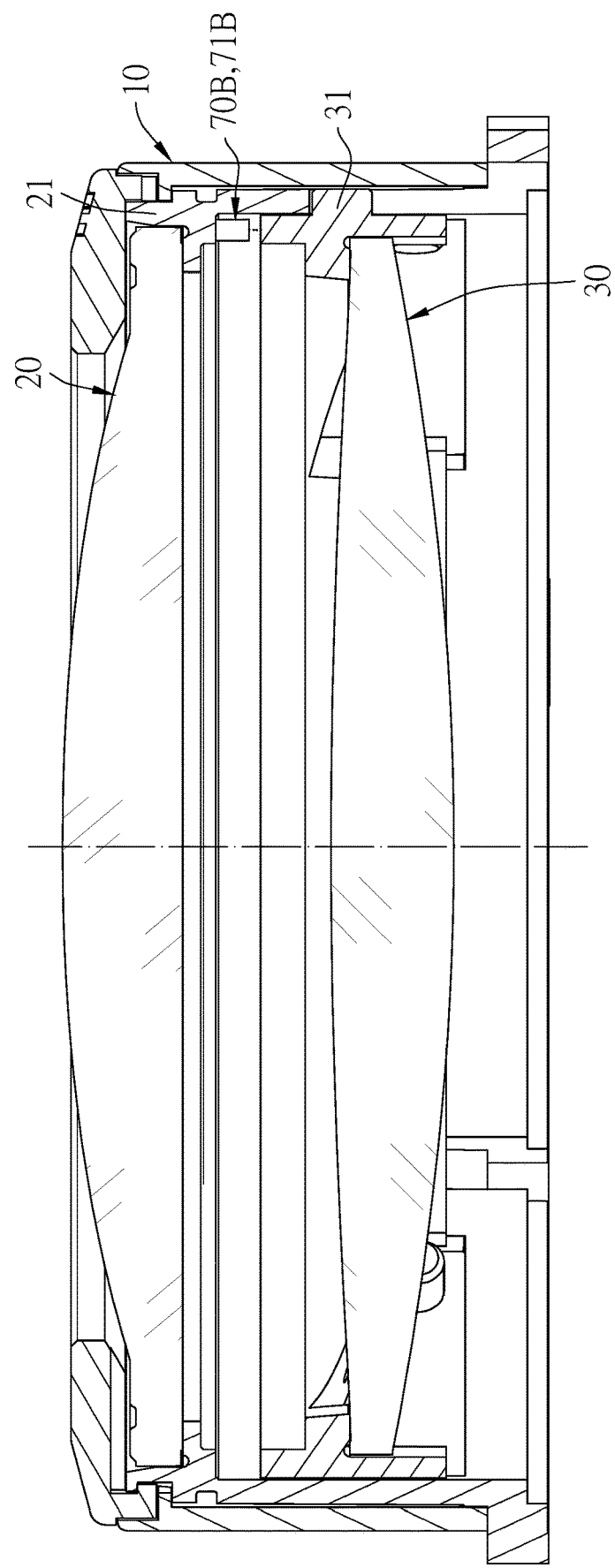
FIG. 4B is a cross-sectional view of the fourth embodiment of the present invention, showing the first lens unit and the second lens unit are in close proximity to each other.
Figure 4C:
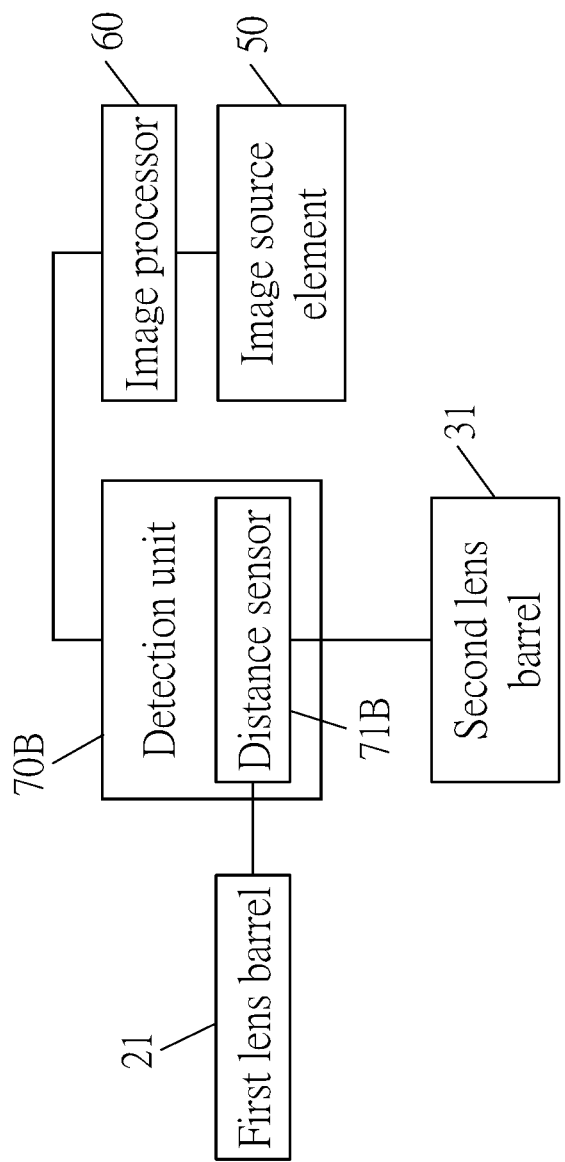
FIG. 4C is a block diagram of the fourth embodiment of the present invention.

Referring to FIGS. 4A to 4C, the fourth embodiment of the present invention provides an optical lens module, which differs from the first embodiment in that:

The detection unit 70B includes a distance sensor 71B, which is located in the first lens barrel 21 and is used to sense the distance between the first lens barrel 21 and the second lens barrel 31 to generate the feedback signal corresponding to the distance. In this embodiment, the distance sensor 71B is a ToF (Time of Flight) sensor, which emits a beam of infrared or laser, and measures the time it takes for the light to reflect back from being emitted. Then, based on the speed of light and the time, the distance to the target object (the second lens barrel 31) is calculated.

Therefore, when the operating element 10 is rotated, it drives the second lens unit 30 (or the first lens unit 20) to move along the central axis X, changing the distance between the first lens unit 20 and the second lens unit 30 on the central axis X. At this time, the second lens barrel 31 of the second lens unit 30 will approach (or move away from) the direction of the first lens barrel 21, at the same time, the distance sensor 71B will also detect the distance between the second lens barrel 31 and the first lens barrel 21, which is the feedback signal. The detection unit 70B will transmit the generated feedback signal to the image processor 60, which will find the correction data of image quality corresponding to the feedback signal and provide the image signal corresponding to different correction data of image quality, and transmit the image signal to the image source element 50.

For example, please refer to the Table 4 below, which shows the correction data of image quality contained in the image processor 60. From Table 4, it can be seen that when the user operates the operating element 10 and changes the distance between the first lens barrel 21 and the second lens barrel 31 from 4.389 mm to 2.756 mm, the diopter correspondingly changes from 0D to 3D and the correction data of image quality (distortion) also correspondingly changes from −27.39% to −31.81%. At this time, the image processor 60 provides an image signal to the image source element 50 corresponding to the correction data of image quality (−31.81%), so that the image light source provided by the image source element 50 forms a distortion-free image after passing through the first lens unit 20 and the second lens unit 30. The image quality correction in the present invention is to perform isometric reverse distortion to the image signal in advance and then provide it to the image source element 50, to enable that the image displayed by the image source provided by the image source element 50 becomes a distortion-free image after passing through the first lens unit 20 and the second lens unit 30. Similarly, the image is adjusted in adjusting the diopter, thereby reducing visual fatigue and discomfort and enhancing the image quality.

TABLE 4

| Distance between first and second lens barrels (mm) | Diopter (mm⁻¹) | Distortion (%) |
| --- | --- | --- |
| 4.389 | 0 | −27.39 |
| 2.756 | 3 | −31.81 |
| 0.969 | 6 | −32.24 |

Fifth Embodiment

Figure 5A:
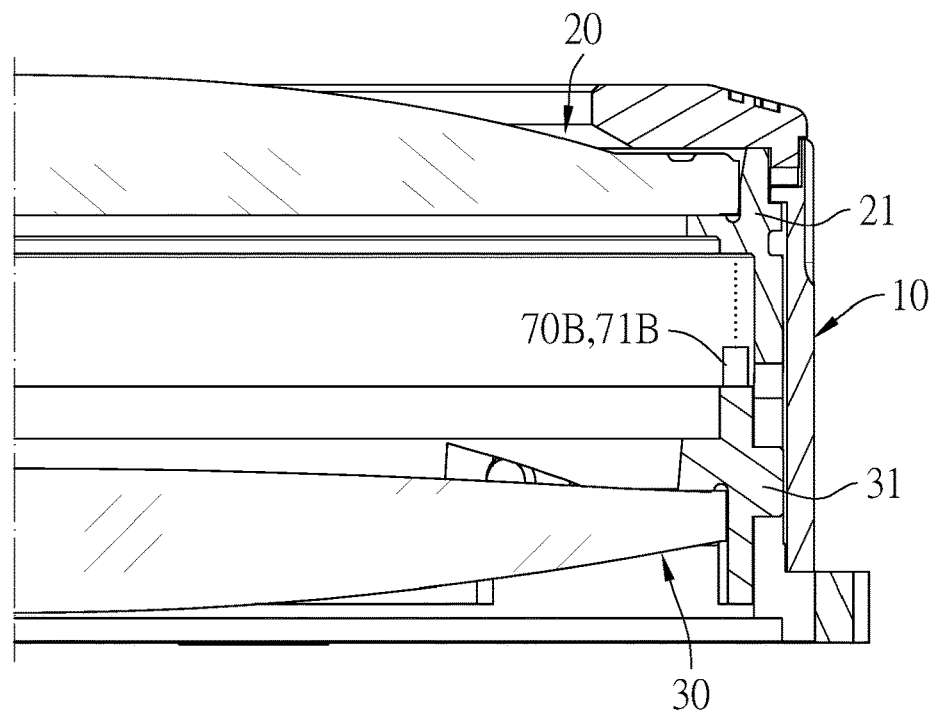
FIG. 5A is a cross-sectional view of a fifth embodiment of the present invention.
Figure 5B:
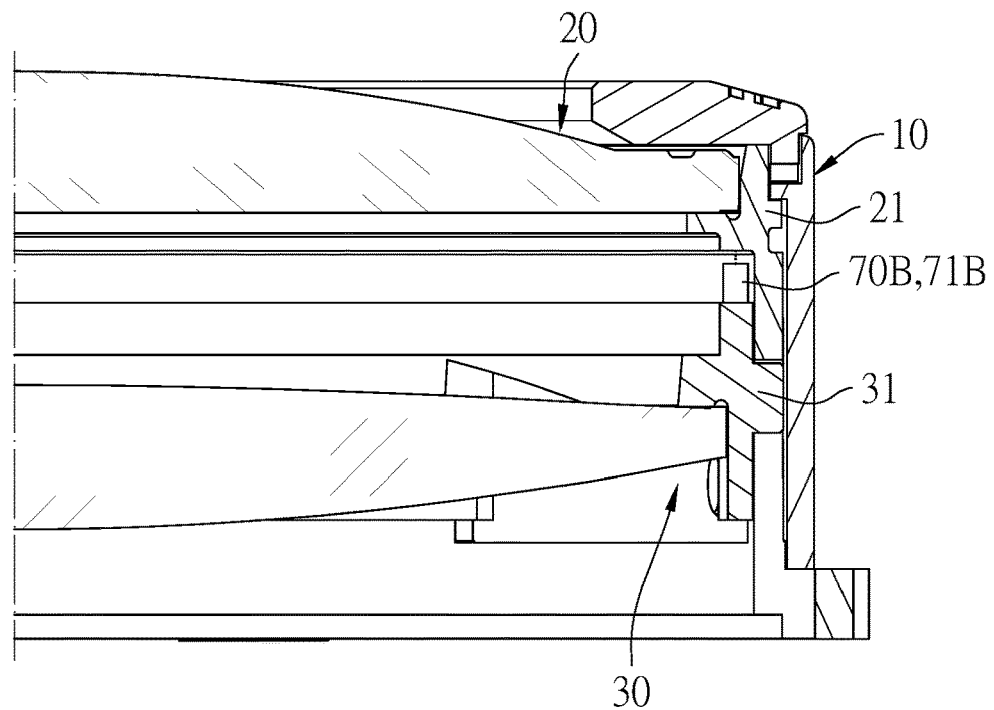
FIG. 5B is a cross-sectional view of the fifth embodiment of the present invention, showing the first lens unit and the second lens unit are in close proximity to each other.

As shown in FIGS. 5A and 5B, the fifth embodiment of the present invention provides an optical lens module, which differs from the fourth embodiment in that:

The detection unit 70B includes a distance sensor 71B, which is disposed to the second lens barrel 31 and is used to sense the distance between the first lens barrel 21 and the second lens barrel 31, and generate the feedback signal corresponding to the distance, so as to form another embodiment.

Sixth Embodiment

Referring to FIGS. 6A to 6F, the sixth embodiment of the present invention provides an optical lens module, which differs from the first embodiment in that:

The detection unit 70C includes a conductor 71C, a sensing element 72C, a power source 73C, and a resistor 74C.

The conductor 71C includes a first conductor material, which is located on the inner annular surface of the operating element 10 and is arranged along the circumference of the operating element 10 in a triangular shape, but not limited thereto. The sensing element 72C includes a second conductor material, which is disposed on the outer surface of the first lens barrel 21 (or the second lens barrel 31). The conductor 71C and the sensing element 72C have an overlapping area in the radial direction, and the size of the overlapping area changes with the rotation of the operating element 10. A capacitive induction is invoked at the overlapping area to generate the corresponding feedback signal. Please refer to FIGS. 6E and 6F again, a first power source end 731C of the power source 73C is electrically connected to the first resister end 741C of the resistor 74C, the second power source end 732C of the power source 73C is electrically connected to the sensing element 72C, and the second resister end 742C of the resistor 74C is electrically connected to the conductor 71C, so that the conductor 71C, the sensing element 72C, the power source 73C, and the resistor 74C form an RC series circuit.

Figure 6A:
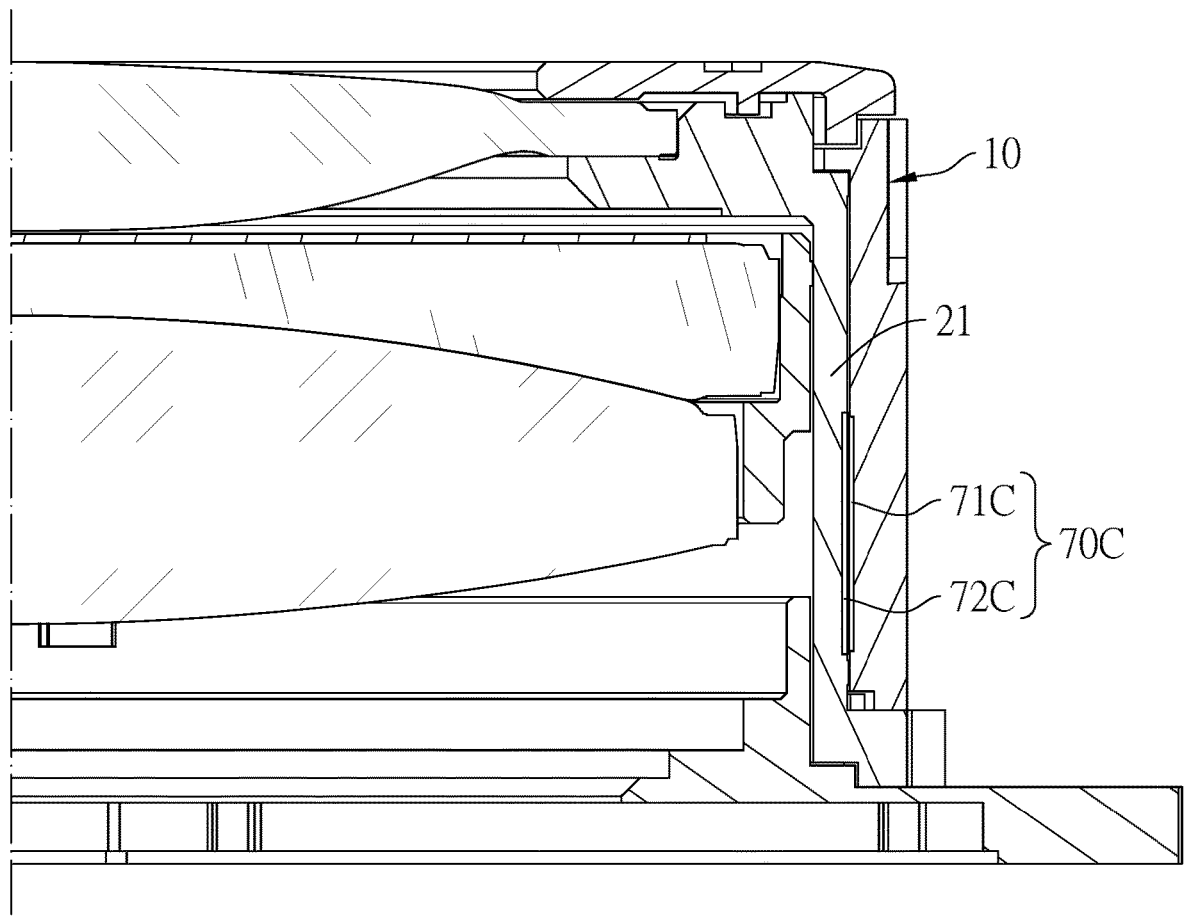
FIG. 6A is a cross-sectional view of a sixth embodiment of the present invention.
Figure 6B:
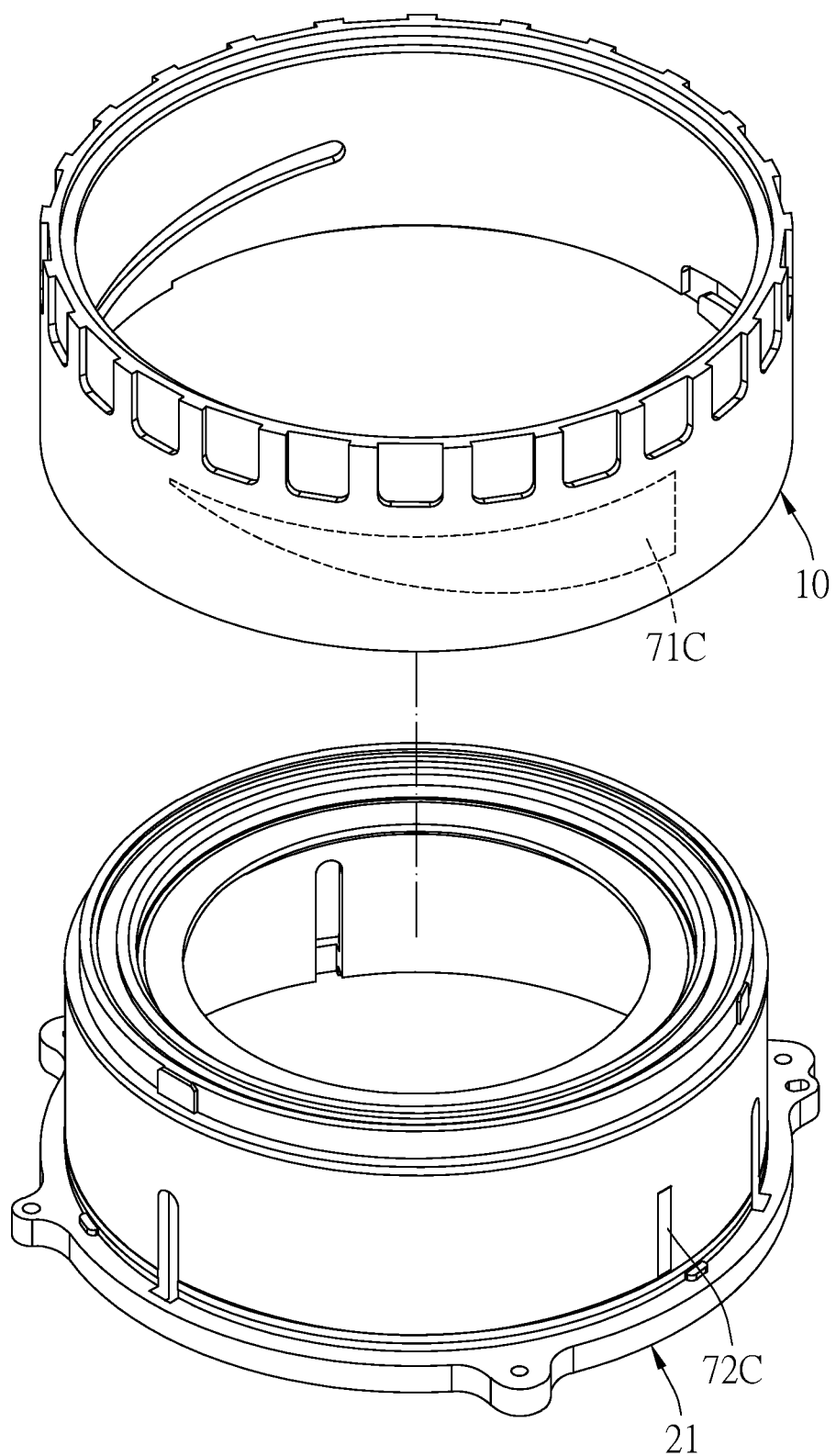
FIG. 6B is a perspective view of the sixth embodiment of the present invention, showing that the operating element is separated from the first lens barrel.
Figure 6C:
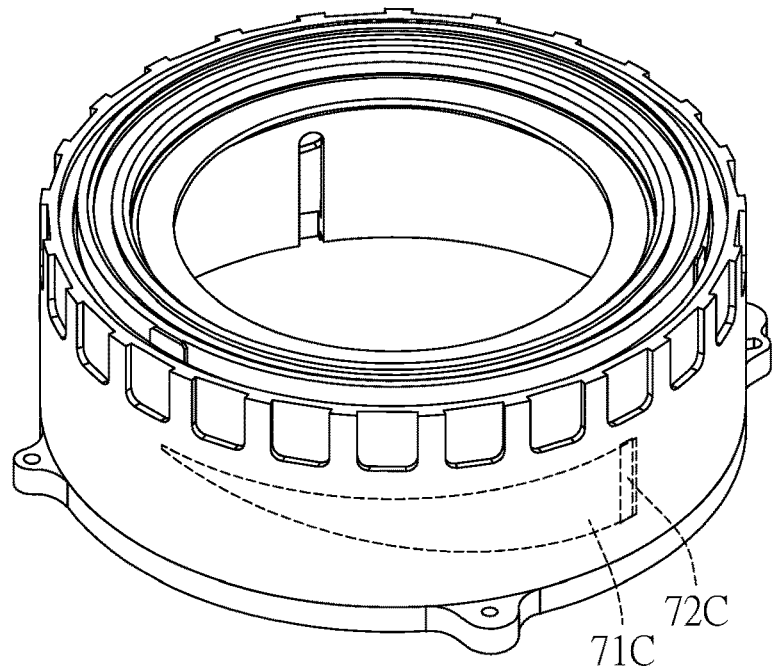
FIG. 6C is a schematic diagram of the sixth embodiment of the present invention, showing the overlapping between the conductor and the sensing element.
Figure 6D:
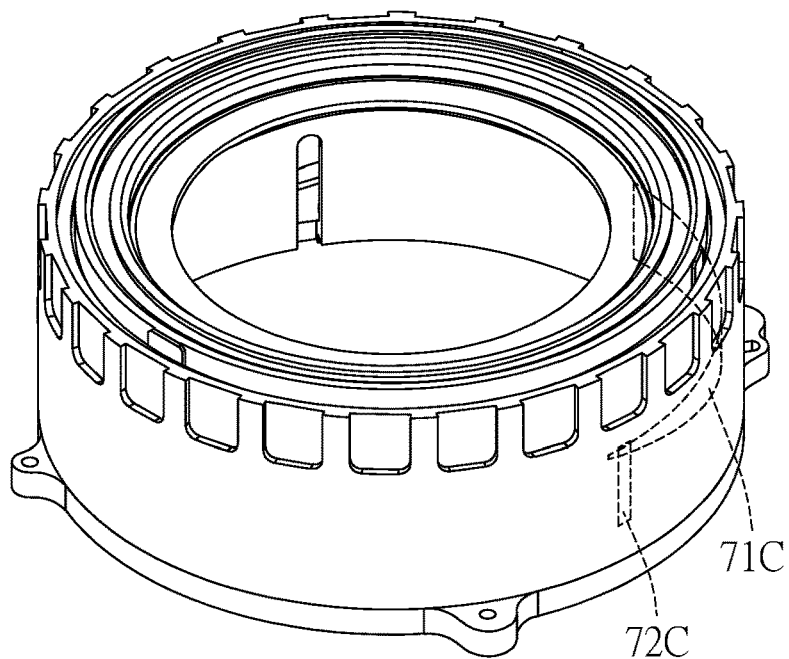
FIG. 6D is a schematic diagram of the sixth embodiment of the present invention, showing the conductor and the sensing element overlap at another position.
Figure 6E:
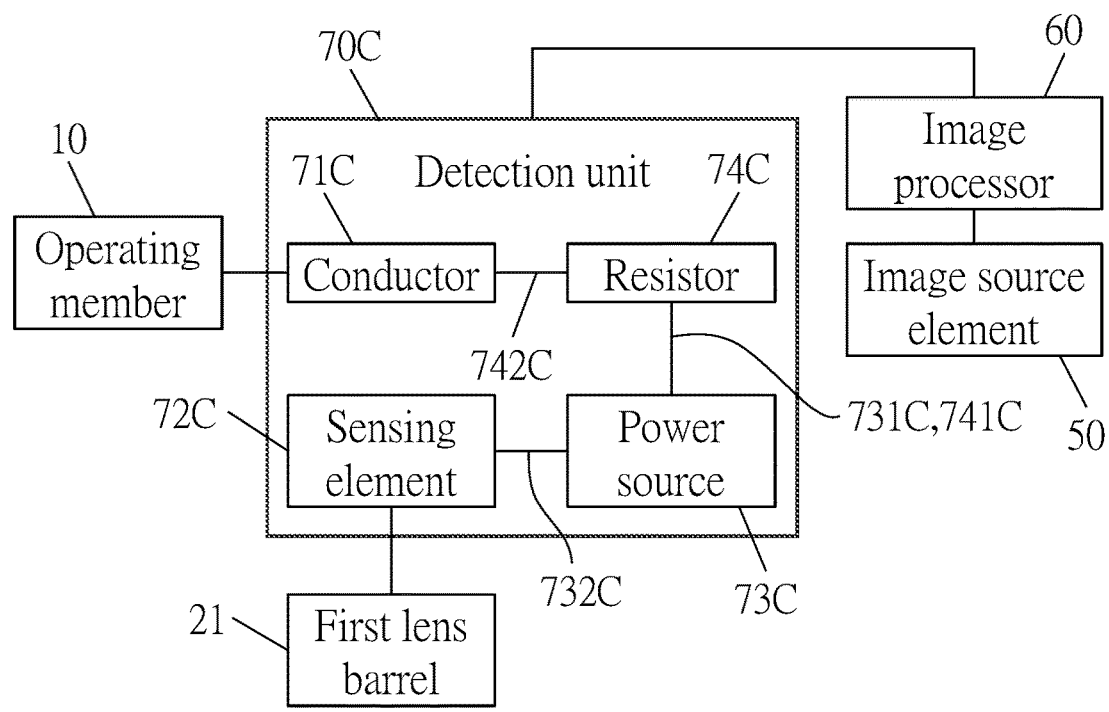
FIG. 6E is a block diagram of the sixth embodiment of the present invention.
Figure 6F:
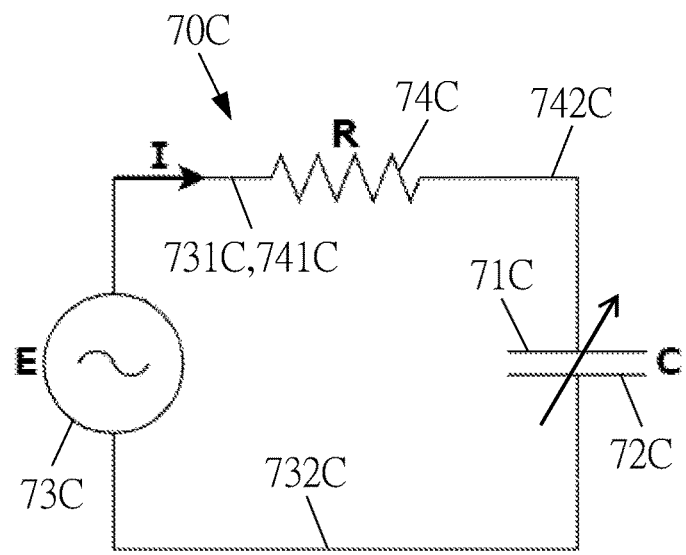
FIG. 6F is a schematic diagram of the sixth embodiment of the present invention, showing a RC series circuit formed by the conductor, the sensing element, the power source, and the resistor.

Please refer to Tables 5 and 6 below, when the user rotates the operating element 10, in addition to driving the second lens unit 30 to move along the central axis X and changing the distance between the first lens unit 20 and the second lens unit 30 on the central axis X, the operating element 10 also changes the capacitance induction invoked at the overlapping area of the conductor 71C and the sensing element 72C in the radial direction while rotating, so as to measure the current value and generate the corresponding feedback signal, that is, to measure the current of the RC series circuit formed by the conductor 71C, the sensing element 72C, the power source 73C, and the resistor 74C, and calculate the total impedance Z based on the formula Z=V/I. Given the resistance R, the capacitance impedance between the conductor 71C and the sensing element 72C can be calculated using the formula ($X_c=\sqrt{Z^2-R^2}$), and given that the frequency f of the power source 73C is 60 Hz, the capacitance value C=1/(2π*f*Xc) between the conductor 71C and the sensing element 72C can be calculated using the formula. Given the distance d1 between the conductor 71C and the sensing element 72C, use the formula to calculate the area distribution A=C*d1/ε (ε is the dielectric constant of air) of the conductor 71C on the inner annular surface of the operating element 10. By using the area distribution A, it is possible to calculate where the sensing element 72C is located in the conductor 71C as shown in FIG. 6C or FIG. 6D, which can determine the rotation angle of the operating element 10. Given the rotation angle of the operating element 10, the corresponding diopter and distortion degree can be obtained (as shown in Table 6); The "rotation angle" in Table 5 refers to the rotation angle of the operating element 10, and the "corresponding diopter" in Table 5 refers to the diopter formed by the first lens unit 20 and the second lens unit 30 after the corresponding operating element 10 is rotated.

element 10 and rotates it from 0 degrees to 30 degrees, its corresponding diopter changes from 0D to 3D, and the corresponding correction data of image quality (distortion) changes from −27.39% to −31.81%. At this time, the image processor 60 provides an image signal to the image source element 50 corresponding to the correction data of image quality (−31.81%), so that the image light source provided by the image source element 50 forms a distortion-free image after passing through the first lens unit 20 and the second lens unit 30. The image quality correction in the present invention is to perform isometric reverse distortion to the image signal in advance and then provide it to the image source element 50, to enable that the image displayed by the image source provided by the image source element 50 becomes a distortion-free image after passing through the first lens unit 20 and the second lens unit 30. Similarly, adjusting both the diopter and the image can reduce visual fatigue and discomfort and enhance the image quality.

TABLE 5

| Voltage V (V) | Resistance R (Ω) | Distance between conductor and sensing element d1 (mm) | Measured current I (mA) | Calculated impedance Z (Ω) |
|---|---|---|---|---|
| 24 | 91 | 0.1 | 201 | 119 |
|  |  | 0.1 | 185 | 130 |
|  |  | 0.1 | 164 | 146 |
|  |  | 0.1 | 136 | 176 |
|  |  | 0.1 | 100 | 240 |
|  |  | 0.1 | 56 | 429 |
|  |  | 0.1 | 6 | 4000 |

| Voltage V (V) | Resistance R (Ω) | Calculated capacitance impedance Xc (Ω) | Calculate capacitance value C (μF) | Overlapping area between conductor and sensing element A (mm²) |
|---|---|---|---|---|
| 24 | 91 | 77 | 34.313 | 3.43 |
|  |  | 92 | 28.689 | 2.87 |
|  |  | 115 | 23.145 | 2.31 |
|  |  | 151 | 17.544 | 1.75 |
|  |  | 222 | 11.944 | 1.19 |
|  |  | 419 | 6.334 | 0.63 |
|  |  | 3999 | 0.663 | 0.07 |

| Voltage V (V) | Resistance R (Ω) | Rotation angle θ (°) | Corresponding diopter D (mm⁻¹) |
|---|---|---|---|
| 24 | 91 | 0 | 0.0 |
|  |  | 10 | 1.0 |
|  |  | 20 | 2.0 |
|  |  | 30 | 3.0 |
|  |  | 40 | 4.0 |
|  |  | 50 | 5.0 |
|  |  | 60 | 6.0 |

TABLE 6

| Rotation angle (°) | Diopter (mm⁻¹) | Distortion (%) |
|---|---|---|
| 0 | 0 | −27.39 |
| 30 | 3 | −31.81 |
| 60 | 6 | −32.24 |

For example, with reference to Tables 5 and 6 above, the correction data of image quality contained in the image processor 60 is displayed. From Table 5, it can be seen that when the voltage of the power source 73C is fixed at 24V, the resistance value of the resistor 74C is fixed at 91Ω, the distance between the conductor 71C and the sensing element 72C is fixed at 0.1 mm, and the user operates the operating It is worth noting that in this embodiment, a resistance of the resistor 74C is R, the overlapping area is A, the distance between the conductor 71C and the sensing element 72C is d1, and the following condition is satisfied: 57.31 Ω*mm< (R*A/d1)<3276.85 Ω*mm. When the above condition is satisfied, the resolution of the detection unit 70C can be improved, and the operating element 10 has better sensitivity and accuracy.

It is worth mentioning that the conductor 71C and the sensing element 72C in the present invention are arranged in such a way that the conductor 71C is set on the operating element 10 which is rotating, and the sensing element 72C is set on the first lens barrel 21 which is fixed and immovable. In other embodiments, in addition to the positions of the conductor 71C and the sensing element 72C being interchangeable, provided that the second lens barrel 31 is fixed and immovable, the sensing element 72C will be located on the second lens barrel 31, and of course, the positions of the conductor 71C and the sensing element 72C can also be interchanged.

Seventh Embodiment

Figure 7A:
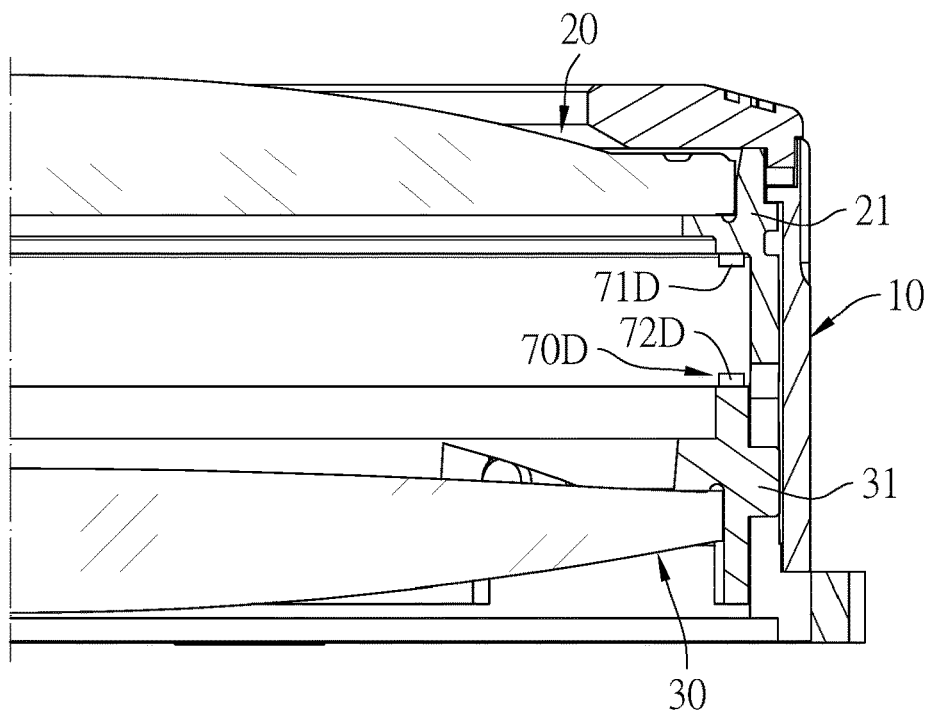
FIG. 7A is a cross-sectional view of a seventh embodiment of the present invention.
Figure 7B:
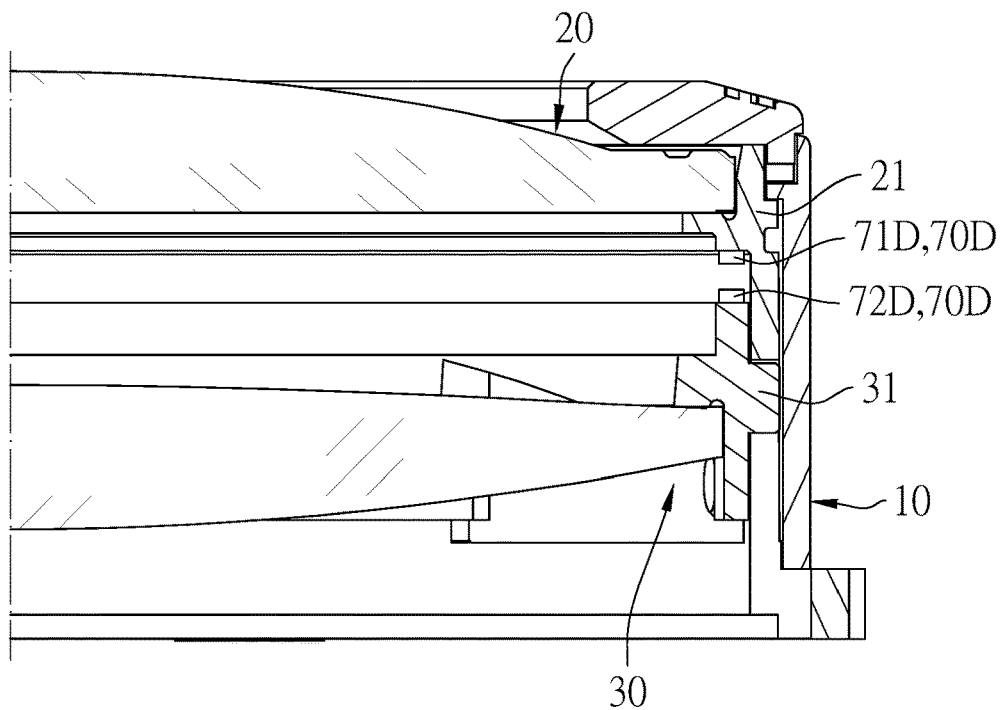
FIG. 7B is a cross-sectional view of the seventh embodiment of the present invention, showing the first lens unit and the second lens unit are in close proximity to each other.
Figure 7C:
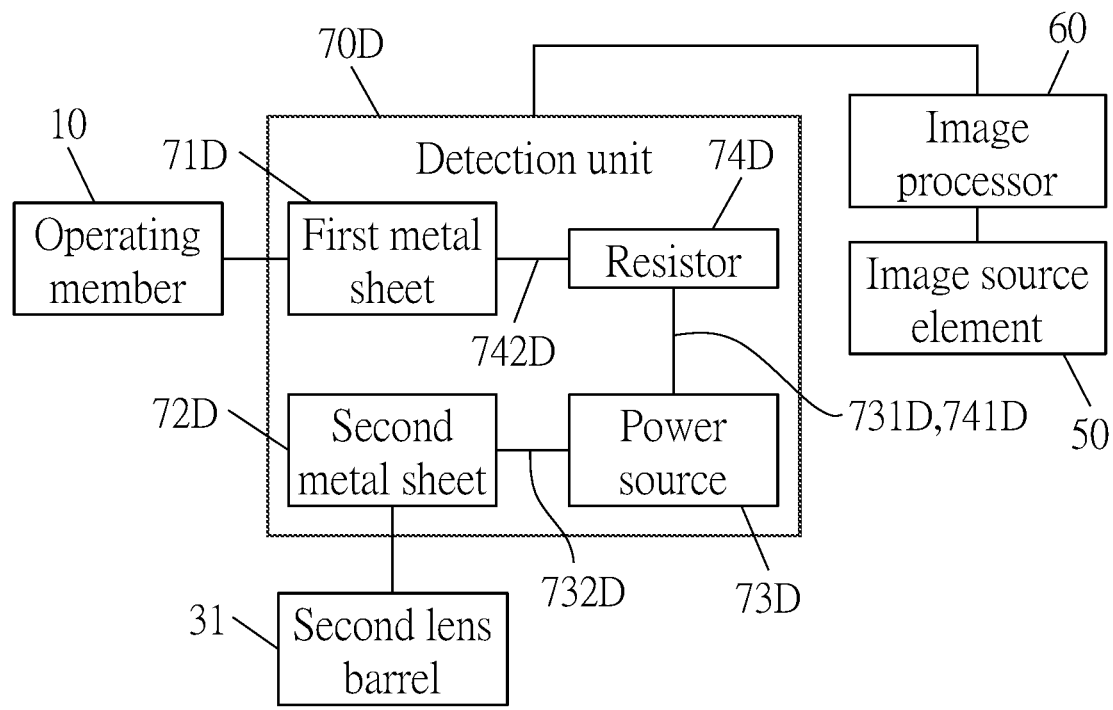
FIG. 7C is a block diagram of the seventh embodiment of the present invention.

Referring to FIGS. 7A to 7C, the seventh embodiment of the present invention provides an optical lens module, which differs from the first embodiment in that:

The detection unit 70D includes a first metal sheet 71D, a second metal sheet 72D, a power source 73D, and a resistor 74D.

Figure 7D:
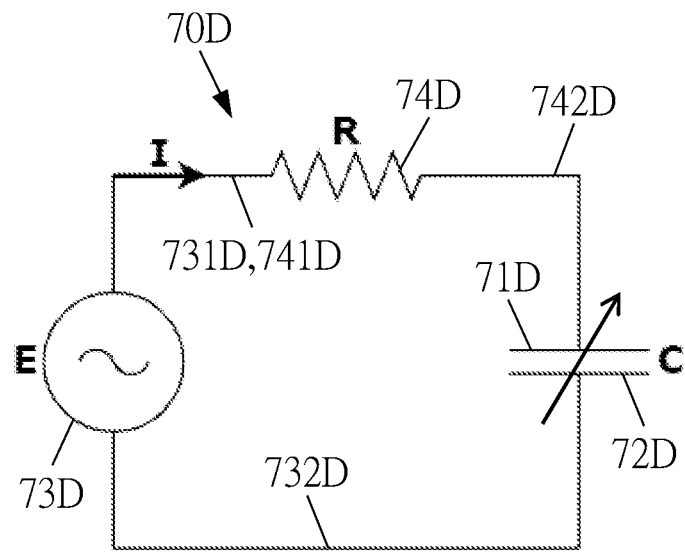
FIG. 7D is a schematic diagram of the seventh embodiment of the present invention, showing a RC series circuit formed by the first metal sheet, the second metal sheet, the power source, and the resistor.

The first metal sheet 71D is disposed to the first lens barrel 21. The second metal sheet 72D is fixed to the second lens barrel 31 and faces the first metal sheet 71D. When the operating element 10 is rotated, a corresponding capacitance induction will be formed between the first metal sheet 71D and the second metal sheet 72D. A current value will be measured based on the capacitance induction, and a feedback signal will be generated corresponding to the current value. The first power source end 731D of the power source 73D is electrically connected to the first resister end 741D of the resistor 74D, the second power source end 732D of the power source 73D is electrically connected to the first metal sheet 71D, and the second resister end 742D of the resistor 74D is electrically connected to the second metal sheet 72D, so that an RC series circuit is formed by the first metal sheet 71D, the second metal sheet 72D, the power source 73D, and the resistor 74D (as shown in FIG. 7D).

With reference to Tables 7 and 8 below, when the user rotates the operating element, the operating element 10 drives the second lens unit 30 to move along the central axis X, changing the distance between the first lens unit 20 and the second lens unit 30 on the central axis X. At this time, the second lens barrel 31 of the second lens unit 30 will approach (or move away from) the first lens barrel 21, which consequently changes the capacitance induction between the first metal sheet 71D and the second metal sheet 72D, so that the current value is measured to generate the corresponding feedback signal. That is, the current of the RC series circuit formed by the first metal sheet 71D, the second metal sheet 72D, the power source 73D, and the resistor 74D is measured, and the total impedance Z is calculated based on the formula Z=V/I. Given the resistance R, the capacitance impedance between the first metal sheet 71D and the second metal sheet 72D is calculated using the formula ($X_c = \sqrt{Z^2-R^2}$). Given that the frequency f of the power source 73D is 60 Hz, use the formula to calculate the capacitance value $C=1/(2\pi*f*X_c)$ between the first metal sheet 71D and the second metal sheet 72D. Given the overlapping area A between the first metal sheet 71D and the second metal sheet 72D, use the formula $d2=\varepsilon*A/C$ to calculate the distance d2 between the first metal sheet 71D and the second metal sheet 72D=$\varepsilon*A/C$, and $\varepsilon$ is the dielectric constant of air. By knowing the distance between the first metal sheet 71D and the second metal sheet 72D, the corresponding diopter and distortion degree can be found (as shown in Table 8); The "rotation angle" in Table 7 refers to the rotation angle of the operating element 10, and the "corresponding diopter" in Table 8 refers to the diopter formed by the first lens unit 2 and the second lens unit 30 after the corresponding operating element 10 is rotated.

TABLE 7

| Voltage V (V) | Resistance R (Ω) | Overlapping area between the first and second metal sheets A (mm$^2$) | Measured current I (mA) | Calculated impedance Z (Ω) |
| --- | --- | --- | --- | --- |
| 24 | 20 | 0.5 | 0.8 | 30.6851 |
|  |  | 0.5 | 1.2 | 20.6494 |
|  |  | 1 | 1.0 | 23.1386 |
|  |  | 1 | 1.1 | 21.2929 |
|  |  | 1 | 1.2 | 20.1643 |
|  |  | 2 | 1.2 | 20.8290 |
|  |  | 2 | 1.2 | 20.0412 |

| Voltage V (V) | Resistance R (Ω) | Calculated capacitance impedance Xc (Ω) | Calculate capacitance value C (μF) | Calculated distance between the first and second metal sheets d2 (mm) |
| --- | --- | --- | --- | --- |
| 24 | 20 | 23.3 | 0.114 | 4.389 |
|  |  | 5.1 | 0.516 | 0.969 |
|  |  | 11.6 | 0.228 | 4.389 |
|  |  | 7.3 | 0.363 | 2.756 |
|  |  | 2.6 | 1.033 | 0.969 |
|  |  | 5.8 | 0.456 | 4.389 |
|  |  | 1.3 | 2.065 | 0.969 |

| Voltage V (V) | Resistance R (Ω) | Rotation angle θ (*) | Corresponding diopter D (mm$^{-1}$) |
| --- | --- | --- | --- |
| 24 | 20 | 0 | 0.0 |
|  |  | 60 | 6.0 |
|  |  | 0 | 0.0 |
|  |  | 30 | 3.0 |
|  |  | 60 | 6.0 |
|  |  | 0 | 0.0 |
|  |  | 60 | 6.0 |

TABLE 8

| Distance between first and second metal sheets d2 (mm) | Diopter (mm$^{-1}$) | Distortion (%) |
|---|---|---|
| 4.389 | 0 | −27.39 |
| 2.756 | 3 | −31.81 |
| 0.969 | 6 | −32.24 |

For example, with reference to Tables 7 and 8 above, the correction data of image quality contained in the image processor 60 is displayed. From Table 7, it can be seen that when the voltage of the power source 73D is fixed at 24V, the resistance value of the resistor 74D is fixed at 20Ω, and the overlapping area of the first metal sheet 71D and the second metal sheet 72D is fixed at 0.5 mm2. When the user operates the operating element 10 to rotate from its rotation angle of 0 degrees to its rotation angle of 60 degrees, the diopter changes correspondingly from 0D to 6D and the correction data of image quality (distortion) also correspondingly changes from −27.39% to −32.24%. At this time, the image processor 60 provides an image signal to the image source element 50 corresponding to the correction data of image quality (−32.24%), so that the image light source provided by the image source element 50 forms a distortion-free image after passing through the first lens unit 20 and the second lens unit 30. The image quality correction in the present invention is to perform isometric reverse distortion to the image signal in advance and then provide it to the image source element 50, to enable that the image displayed by the image source provided by the image source element 50 becomes a distortion-free image after passing through the first lens unit 20 and the second lens unit 30. Similarly, while adjusting the diopter, the image is adjusted to reduce visual fatigue, discomfort and improve image quality.

It is worth noting that in this embodiment, the distance between the first metal sheet 71D and the second metal sheet 72D is d2, the resistance of the resistor 74D is R, the overlapping area between the first metal sheet 71D and the second metal sheet 72D is A, and the following condition is satisfied: 9.21 Ω/mm<(d2*R/A)<184.34 Ω/mm. When the above condition is satisfied, the resolution of the detection unit 70D can be improved, and the operating element 10 has better sensitivity and accuracy.

Eighth Embodiment

Figure 8A:
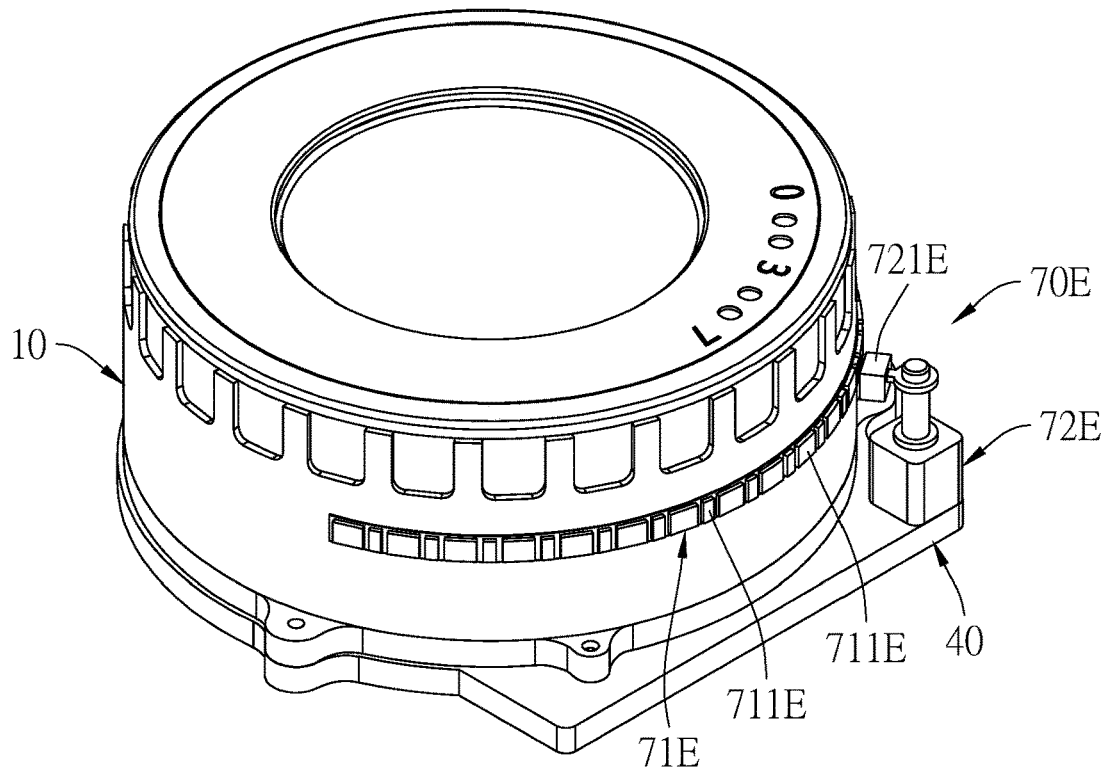
FIG. 8A is a perspective view of an eighth embodiment of the present invention.
Figure 8B:
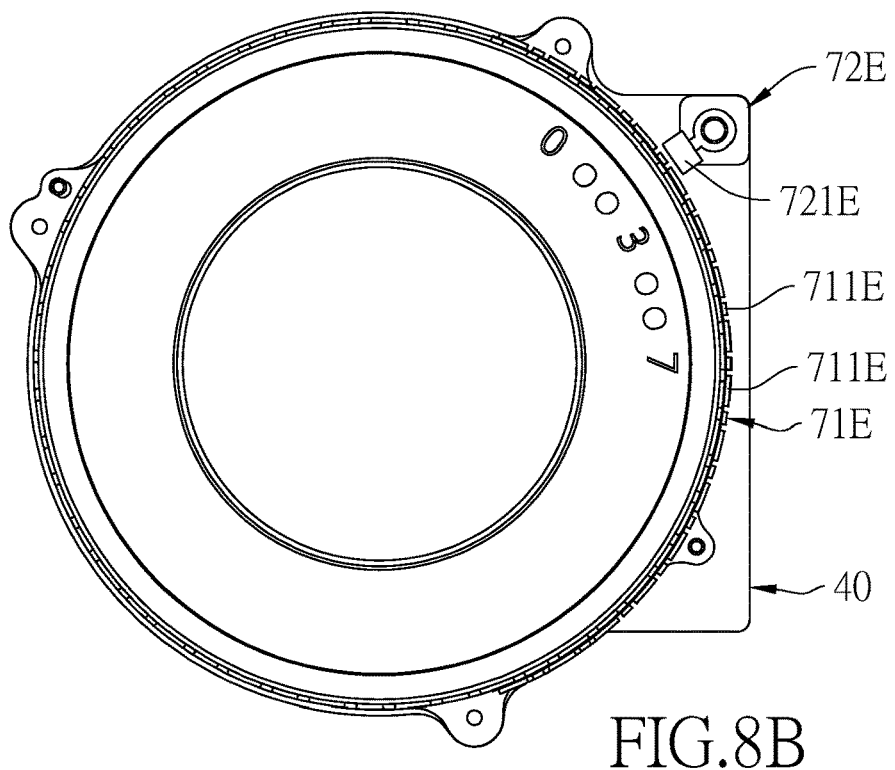
FIG. 8B is a top view of the eighth embodiment of the present invention.
Figure 8C:
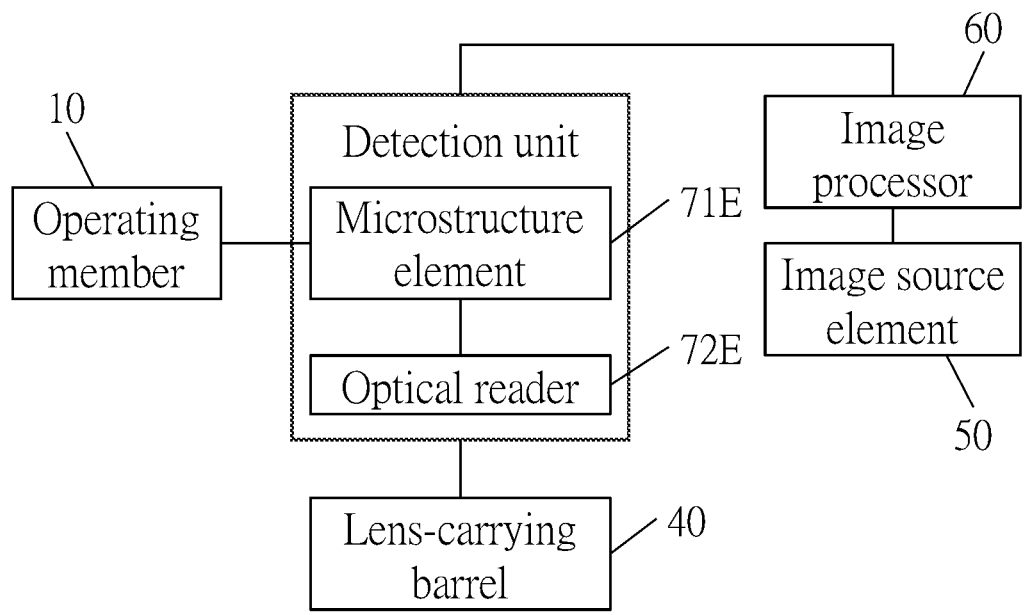
FIG. 8C is a block diagram of the eighth embodiment of the present invention.

Referring to FIGS. 8A to 8C, the eighth embodiment of the present invention provides an optical lens module, which differs from the first embodiment in that:

The detection unit 70E includes a microstructure element 71E and an optical reader 72E.

The microstructure element 71E is located on the outer annular surface of the operating element 10 and includes a plurality of different types of rough surfaces 711E; In this embodiment, the microstructure element 71E is formed by surface treatment on the outer annular surface of the operating element 10. By using the unprocessed part (smooth surface) and the processed part (rough surface 711E) on the operating element 10, different sizes of arrangements are formed to form optical lithography with different codes.

The optical reader 72E is fixed on the holder 40 and has a reading head 721E for reading the rough surface 711E of the microstructure element 71E. The reading head 721E can be, but not limited to, a small device with a light source and a light sensor, and maintains a certain distance and angle with the microstructure element 71E. The reading head 721E will emit a beam of light onto the microstructure element 71E and receive the reflected light signal. Based on the reflected energy of the light, the position or distance of movement will be calculated.

When the operating element 10 is actuated, the reading head 721E will read the rough surface 711E corresponding to the microstructure element 71E (such as reading the reflection efficiency of the light source on the rough surface 711E) and generate the corresponding feedback signal according to the shape of the rough surface 711E (such as shape, density, or material of the surface of the microstructure).

TABLE 9

| Rotation angle (°) | Diopter (mm$^{-1}$) | Distortion(%) |
|---|---|---|
| 0 | 0 | −27.39 |
| 30 | 3 | −31.81 |
| 60 | 6 | −32.24 |

For example, please refer to the Table 9 above, the correction data of image quality contained in the image processor 60 is displayed. From Table 9, it can be seen that when the user operates the operating element 10 to rotate from its rotation angle of 0 degrees to its rotation angle of 30 degrees, the diopter correspondingly changes from 0D to 3D and the correction data of image quality (distortion) also correspondingly changes from −27.39% to −31.81%. At this time, the image processor 60 provides an image signal to the image source element 50 corresponding to the correction data of image quality (−31.81%), so that the image light source provided by the image source element 50 forms a distortion-free image after passing through the first lens unit 20 and the second lens unit 30. The image quality correction in the present invention is to perform isometric reverse distortion to the image signal in advance and then provide it to the image source element 50, to enable that the image displayed by the image source provided by the image source element 50 becomes a distortion-free image after passing through the first lens unit 20 and the second lens unit 30. Similarly, adjusting both the diopter and the image can reduce visual fatigue and discomfort and enhance the image quality.

Ninth Embodiment

Figure 9A:
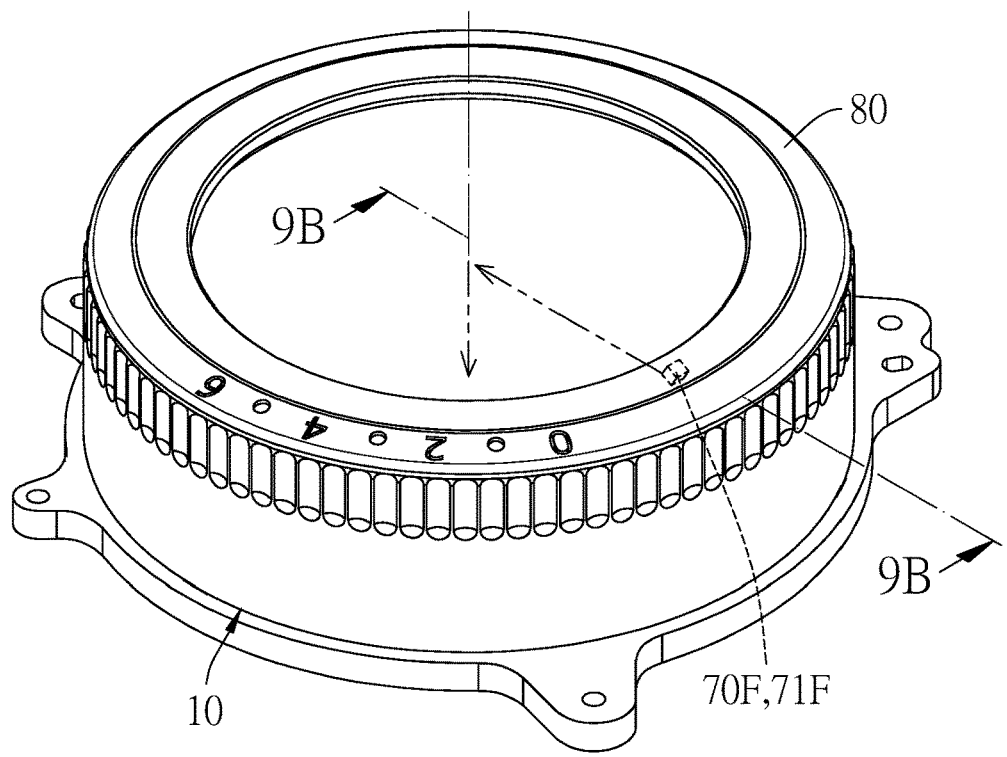
FIG. 9A is a perspective view of a ninth embodiment of the present invention.
Figure 9B:
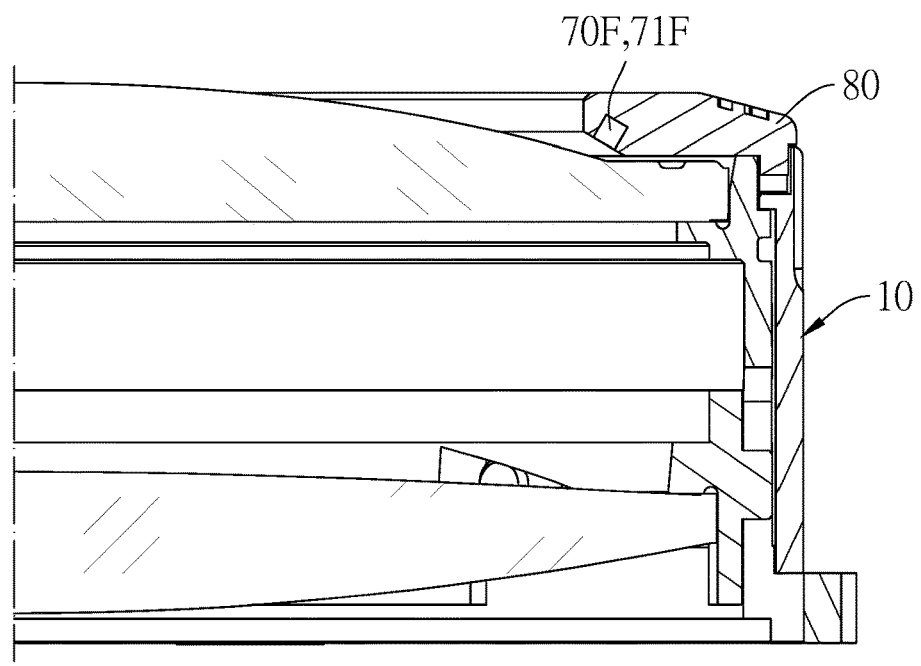
FIG. 9B is a cross-sectional view of the ninth embodiment of the present invention.
Figure 9C:
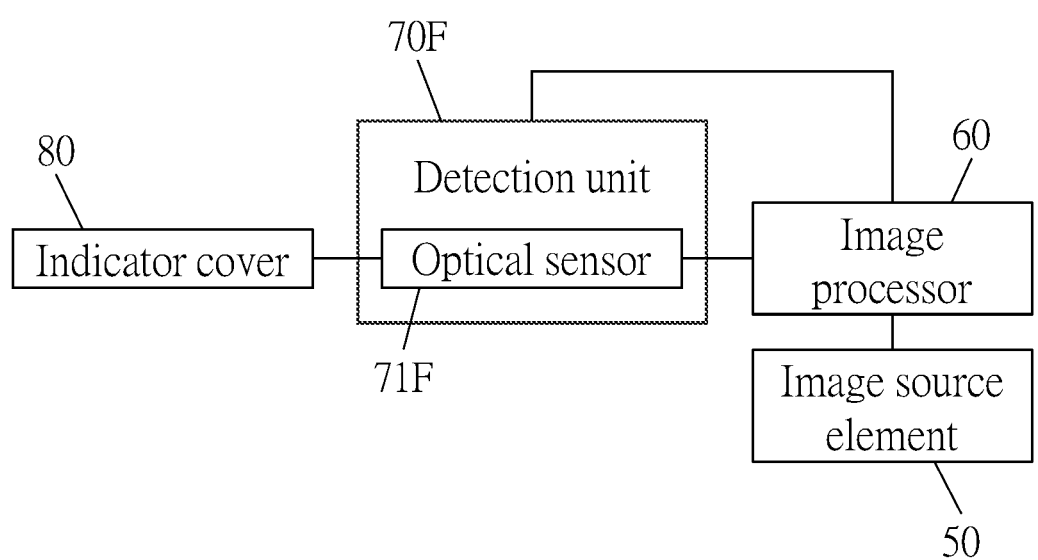
FIG. 9C is a block diagram of the ninth embodiment of the present invention.

Referring to FIGS. 9A to 9C, the ninth embodiment of the present invention provides an optical lens module, which differs from the first embodiment in that:

The optical lens module further includes an indicator cover 80, which is located at the visual end of the operating element 10. The detection unit 70F is an optical sensor 71F, used to detect the imaging distance (or the focusing state of the optical sensor 71F, but not limited thereto) of the image source element 50 passing through these lens units, and generate the feedback signal corresponding to the imaging distance (or the focusing state of the optical sensor 71F, but not limited thereto).

The optical lens module further includes an indicator cover 80, which is located at the end of the visual side of the operating element 10. The detection unit 70F is an optical sensor 71F. In this embodiment, an automatic zoom lens is taken as an example, and the optical sensor 71F is located on the indicator cover 80, which can sense changes in focal length and provide the value of focal length change through digital output or analog signals. The diopter change corresponding to the change in focal length can be determined by calculating with the image processor 60, that is, the optical sensor 71F obtains the image and determines its clarity, then automatically adjusts the focal length to make the image the clearest, and simultaneously feedbacks the imaging distance of the image processor 60 when the image is clear. Then, the distortion degree corresponding to each diopter is obtained from the database of the image processor 60, then, the image processor 60 outputs the corresponding reverse distorted image signal to the image source element, and after passing through these lens units, a distortion free image is presented to improve the viewing quality and comfort of the user.

TABLE 10

| Imaging distance (mm) | Diopter (mm$^{-1}$) | Distortion (%) |
|---|---|---|
| 2500 | 0 | −27.39 |
| 333 | 3 | −31.81 |
| 167 | 6 | −32.24 |

For example, please refer to Table 10 above, which shows the correction data of image quality contained in the image processor 60, from Table 10, it can be seen that when the user operates the operating element 10 to change the virtual image distance measured by the detection unit 70F from 2500 mm to 333 mm, its corresponding diopter changes from 0D to 3D, and the corresponding correction data of image quality (distortion) changes from −27.39% to −31.81%. At this time, the image processor 60 provides the image signal to the image source element 50 corresponding to the correction data of image quality (−31.81%), so that the image light source provided by the image source element 50 forms a distortion-free image after passing through the first lens unit 20 and the second lens unit 30. The image quality correction in the present invention is to perform isometric reverse distortion to the image signal in advance and then provide it to the image source element 50, to enable that the image displayed by the image source provided by the image source element 50 becomes a distortion-free image after passing through the first lens unit 20 and the second lens unit 30. Similarly, the image is adjusted in adjusting the diopter, thereby reducing visual fatigue and discomfort and enhancing the image quality.

Figure 10:
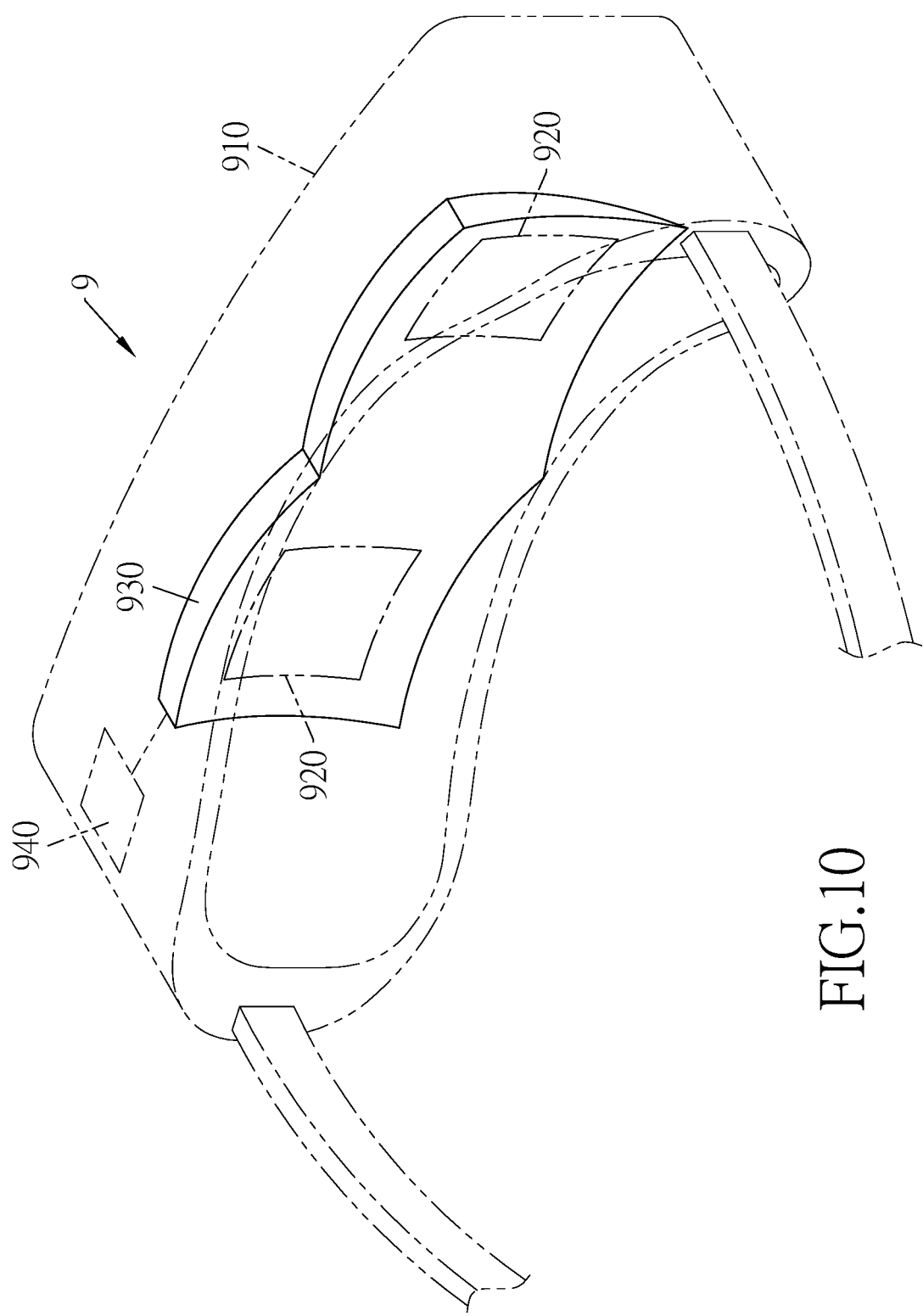
FIG. 10 is a schematic diagram of a tenth embodiment of the present invention, showing the wearable electronic device perspectively.

In addition, the optical lens module provided by the present invention can be applied to head mounted electronic devices. Please refer to FIG. 10 for an illustrative view of a wearable electronic device according to the tenth embodiment of the present invention. The wearable electronic device 91 is, for example, but not limited to, a head mounted display using virtual reality technology. The optical lens modules 92 are provided on a frame 93, and the number of the optical lens modules 92 is two and the optical lens modules 92 are electrically connected to a controller 94.

What is claimed is:

1. An optical lens module with a central axis, comprising:
   an operating element including an annular wall surrounding the central axis with a visual side and an image source side, and a storage space enclosed by the annular wall;
   a first lens unit disposed in the storage space and including a first lens barrel and a first lens group disposed in the first lens barrel;
   a second lens unit disposed in the storage space and including a second lens barrel and a second lens group disposed in the second lens barrel;
   a holder disposed on an image source side of the second lens unit;
   an image source element disposed on the holder;
   an image processor electrically connected to the image source element, and including correction data of image quality and an image signal; and
   a detection unit electrically connected to the image processor to provide a feedback signal;
   wherein the first lens unit and the second lens unit are arranged in order from the visual side to the image source side of the central axis; when the operating element is actuated, the operating element drives the first lens unit or the second lens unit to move along the central axis to change a distance between the first lens unit and the second lens unit along the central axis, the detection unit generates and transmits the feedback signal to the image processor, and then, the image processor obtains the correction data of image quality according to the feedback signal and provides the correction data of image quality to the image source element.

2. The optical lens module as claimed in claim 1, wherein the detection unit includes a toothed structure and a rotary encoder, the toothed structure is located on the operating element and includes first teeth, the rotary encoder includes an encoder body and a shaft disposed to the encoder body, and the shaft includes second teeth directly or indirectly engaged with the first teeth; and when the operating element is rotated, the toothed structure drives the shaft to rotate and the encoder body detects a rotation angle of the shaft to generate the feedback signal corresponding to the rotation angle.

3. The optical lens module as claimed in claim 1, wherein the detection unit includes an impedance element and a contact probe, the impedance element is arranged along a circumferential direction on the operating element, and has a same resistance in the circumferential direction, and the contact probe is disposed to the holder; and when the operating element is actuated, the contact probe contacts the impedance element to generate the feedback signal according to an amount of displacement of the contact between the contact probe and the impedance element.

4. The optical lens module as claimed in claim 1, wherein the detection unit includes a distance sensor, the distance sensor is disposed to the first lens barrel or the second lens barrel and is configured to sense a distance between the first lens barrel and the second lens barrel to generate the feedback signal according to the distance.

5. The optical lens module as claimed in claim 1, wherein the detection unit includes a conductor and a sensing element, the conductor includes a first conductor material, the sensing element includes a second conductor material, the conductor is disposed to the operating element, the sensing element is disposed to the first lens barrel or the second lens barrel, the conductor and the sensing element have an overlapping area therebetween in a radial direction, the overlapping area changes with the operation of the operating element, and a capacitive induction is invoked at the overlapping area to generate the feedback signal.

6. The optical lens module as claimed in claim 5, wherein the detection unit includes a power source and a resistor, a first power source end of the power source is electrically connected to a first resister end of the resistor, a second power source end of the power source is electrically connected to the sensing element, and a second resister end of the resistor is electrically connected to the conductor.

7. The optical lens module as claimed in claim 6, wherein a resistance of the resistor is R, the overlapping area is A, a distance between the conductor and the sensing element is d1, and the following condition is satisfied:

$$57.31 \Omega * mm < (R*A/d1) < 3276.85 \Omega * mm.$$

8. The optical lens module as claimed in claim 1, wherein the detection unit includes a first metal sheet and a second metal sheet, the first metal sheet is disposed to the first lens barrel, the second metal sheet is disposed to the second lens barrel and faces the first metal sheet, and when the operating element is rotated, a capacitance induction is invoked between the first metal sheet and the second metal sheet to generate the feedback signal corresponding to the capacitance induction.

9. The optical lens module as claimed in claim 8, wherein the detection unit includes a power source and a resistor, a first power source end of the power source is electrically connected to a first resister end of the resistor, a second power source end of the power source is electrically connected to the first metal sheet, and a second resister end of the resistor is electrically connected to the second metal sheet.

10. The optical lens module as claimed in claim 9, wherein a distance between the first metal sheet and the second metal sheet is d2, a resistance of the resistor is R, an overlapping area between the first metal sheet and the second metal sheet is A, and the following condition is satisfied: 9.21 Ω/mm<(d2*R/A)<184.34 Ω/mm.

11. The optical lens module as claimed in claim 1, wherein the detection unit includes a microstructure element and an optical reader, the microstructure element is located on an outer annular surface of the operating element and includes rough surfaces of different types, the optical reader is disposed to the holder and includes a reading head for reading the rough surfaces of the microstructure element, and when the operating element is actuated, the reading head reads the rough surface of the microstructure element to generate the feedback signal according to the type of the rough surface.

12. The optical lens module as claimed in claim 1, wherein the optical lens module further includes an indicator cover located at a visual end of the operating element, and the detection unit is an optical sensor configured to detect an imaging distance from the image source element through the lens units, to generate the feedback signal according to the imaging distance.

13. A wearable electronic device, comprising:
a frame; and
an optical lens module having a central axis with a visual side and an image source side, disposed to the frame, and comprising:
an operating element including an annular wall surrounding the central axis, and a storage space enclosed by the annular wall;
a first lens unit disposed in the storage space and including a first lens barrel and a first lens group disposed in the first lens barrel;
a second lens unit disposed in the storage space and including a second lens barrel and a second lens group disposed in the second lens barrel;
a holder disposed on an image source side of the second lens unit;
an image source element disposed on the holder;
an image processor electrically connected to the image source element, and including correction data of image quality and an image signal; and
a detection unit electrically connected to the image processor to provide a feedback signal;
wherein the first lens unit and the second lens unit are arranged in order from the visual side to the image source side of the central axis; when the operating element is actuated, the operating element drives the first lens unit or the second lens unit to move along the central axis to change a distance between the first lens unit and the second lens unit along the central axis, the detection unit generates and transmits the feedback signal to the image processor, and then, the image processor obtains the correction data of image quality according to the feedback signal, and provides the correction data of image quality to the image source element.

14. The wearable electronic device as claimed in claim 13, wherein the detection unit includes a toothed structure and a rotary encoder, the toothed structure is located on the operating element and includes first teeth, the rotary encoder includes an encoder body and a shaft disposed to the encoder body, and the shaft includes second teeth directly or indirectly engaged with the first teeth; and when the operating element is rotated, the toothed structure drives the shaft to rotate and the encoder body detects a rotation angle of the shaft to generate the feedback signal corresponding to the rotation angle.

15. The wearable electronic device as claimed in claim 13, wherein the detection unit includes an impedance element and a contact probe, the impedance element is arranged along a circumferential direction on the operating element, and has a same resistance in the circumferential direction, and the contact probe is disposed to the holder; and when the operating element is actuated, the contact probe contacts the impedance element to generate the feedback signal according to an amount of displacement of the contact between the contact probe and the impedance element.

16. The wearable electronic device as claimed in claim 13, wherein the detection unit includes a distance sensor, the distance sensor is disposed to the first lens barrel or the second lens barrel and is configured to sense a distance between the first lens barrel and the second lens barrel to generate the feedback signal according to the distance.

17. The wearable electronic device as claimed in claim 13, wherein the detection unit includes a conductor and a sensing element, the conductor includes a first conductor material, the sensing element includes a second conductor material, the conductor is disposed to the operating element, the sensing element is disposed to the first lens barrel or the second lens barrel, the conductor and the sensing element have an overlapping area therebetween in a radial direction, the overlapping area changes with the operation of the operating element, and a capacitive induction is invoked at the overlapping area to generate the feedback signal.

18. The wearable electronic device as claimed in claim 17, wherein the detection unit includes a power source and a resistor, a first power source end of the power source is electrically connected to a first resister end of the resistor, a second power source end of the power source is electrically connected to the sensing element, and a second resister end of the resistor is electrically connected to the conductor.

19. The wearable electronic device as claimed in claim 18, wherein a resistance of the resistor is R, the overlapping area is A, a distance between the conductor and the sensing element is d1, and the following condition is satisfied:

$$57.31 \Omega * mm < (R*A/d1) < 3276.85 \Omega * mm.$$

20. The wearable electronic device as claimed in claim 13, wherein the detection unit includes a first metal sheet and a second metal sheet, the first metal sheet is disposed to the first lens barrel, the second metal sheet is disposed to the second lens barrel and faces the first metal sheet, and when the operating element is rotated, a capacitance induction is invoked between the first metal sheet and the second metal sheet to generate the feedback signal corresponding to the capacitance induction.

21. The wearable electronic device as claimed in claim 20, wherein the detection unit includes a power source and a resistor, a first power source end of the power source is electrically connected to a first resister end of the resistor, a second power source end of the power source is electrically connected to the first metal sheet, and a second resister end of the resistor is electrically connected to the second metal sheet.

22. The wearable electronic device as claimed in claim 21, wherein a distance between the first metal sheet and the second metal sheet is d2, a resistance of the resistor is R, an overlapping area between the first metal sheet and the second metal sheet is A, and the following condition is satisfied: 9.21 Ω/mm<(d2*R/A)<184.34 Ω/mm.

23. The wearable electronic device as claimed in claim 13, wherein the detection unit includes a microstructure element and an optical reader, the microstructure element is located on an outer annular surface of the operating element and includes rough surfaces of different types, the optical reader is disposed to the holder and includes a reading head for reading the rough surfaces of the microstructure element, and when the operating element is actuated, the reading head reads the rough surface of the microstructure element to generate the feedback signal according to the type of the rough surface.

24. The wearable electronic device as claimed in claim 13, wherein the optical lens module further includes an indicator cover located at a visual end of the operating element, and the detection unit is an optical sensor configured to detect an imaging distance from the image source element through the lens units, to generate the feedback signal according to the imaging distance.

* * * * *